(12) United States Patent
Barthold et al.

(10) Patent No.: US 9,618,309 B2
(45) Date of Patent: Apr. 11, 2017

(54) APPARATUS AND ELECTRIC PRIMER OUTPUT DATA TESTING METHOD

(71) Applicant: The United States of America as represented by the Secretary of the Navy, Washington, DC (US)

(72) Inventors: Frederick L. Barthold, Solsberry, IN (US); Gregory Deckard, Springville, IN (US); Terry J. Coy, Bloomington, IN (US); Thomas Raley, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 223 days.

(21) Appl. No.: 14/698,738

(22) Filed: Apr. 28, 2015

(65) Prior Publication Data

US 2016/0252337 A1    Sep. 1, 2016

Related U.S. Application Data

(60) Provisional application No. 61/984,995, filed on Apr. 28, 2014.

(51) Int. Cl.
*F42C 21/00* (2006.01)
*F42C 19/12* (2006.01)
(Continued)

(52) U.S. Cl.
CPC .............. *F42C 21/00* (2013.01); *F42C 19/12* (2013.01); *F41A 19/57* (2013.01); *F41A 19/58* (2013.01); *G01K 13/00* (2013.01); *G01L 23/00* (2013.01)

(58) Field of Classification Search
CPC .................................. F42C 21/00; F42C 19/12
(Continued)

(56) References Cited

U.S. PATENT DOCUMENTS 3,778,709 A    12/1973 Williams et al.
3,814,017 A    6/1974 Backstein et al.
(Continued)

FOREIGN PATENT DOCUMENTS

CN    102183273 B  *  3/2015  ............. G01D 21/02
EP    0798535 A1    10/1997

OTHER PUBLICATIONS

Wang et al., Sep. 2011, Espacenet, translation of CN 102183273.*
(Continued)

*Primary Examiner* — Peter Macchiarolo
*Assistant Examiner* — Timothy Graves
(74) *Attorney, Agent, or Firm* — Christopher A. Monsey

(57) ABSTRACT

Exemplary methods and apparatus for testing an electrically fired item, e.g., a primer-only cartridge or all-up round (AUR) cartridge, in a variety of modes are provided. For example, a test system may provide a method of testing a primer-only cartridge and an apparatus to execute such method. Various parameters associated with operation of the electrically fired item, such as a primer or initiator, may be varied and measured using an embodiment including programmable selection of a pulse duration for firing control signals, a voltage of the firing control signals, and a number of pulses associated with the firing control signals. An inline resistance of the path of the control signals may also be adjusted. Test data including temperature, pressure, voltage, and/or current associated with operation of the electrically fired item may be measured during tests and displayed on a display device.

27 Claims, 22 Drawing Sheets

(51) Int. Cl.
   *G01L 23/00* (2006.01)
   *F41A 19/57* (2006.01)
   *G01K 13/00* (2006.01)
   *F41A 19/58* (2006.01)

(58) Field of Classification Search
   USPC .............................................. 73/1.42, 35.15
   See application file for complete search history.

(56) References Cited

U.S. PATENT DOCUMENTS

| | | |
|---|---|---|
| 3,865,028 A | 2/1975 | Thakore |
| 5,146,104 A | 9/1992 | Schumacher et al. |
| 5,755,056 A | 5/1998 | Danner et al. |
| 6,286,242 B1 | 9/2001 | Klebes |
| 6,722,282 B2 | 4/2004 | Duerschinger |
| 7,047,885 B1 | 5/2006 | Crickenberger et al. |
| 7,984,579 B2 | 7/2011 | Brundula et al. |
| 8,924,073 B2 | 12/2014 | Marino et al. |

OTHER PUBLICATIONS

Bement, L.J. et al., "An Investigation to Improve Quality Evaluations of Primers and Propellant for 20mm Munitions", Presented at the Munitions Technology Symposium IV, Feb. 10-12, 1997, Reno, Nevada; retrieved from the Internet at: http://ntrs.nasa.gov/archive/nasa/casi.ntrs.nasa.gov/20040110684.pdf. 30 pages.

* cited by examiner

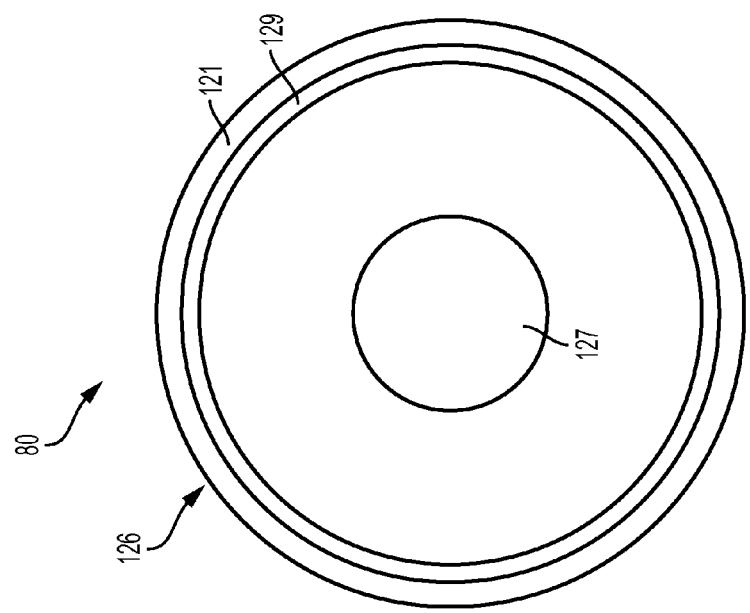
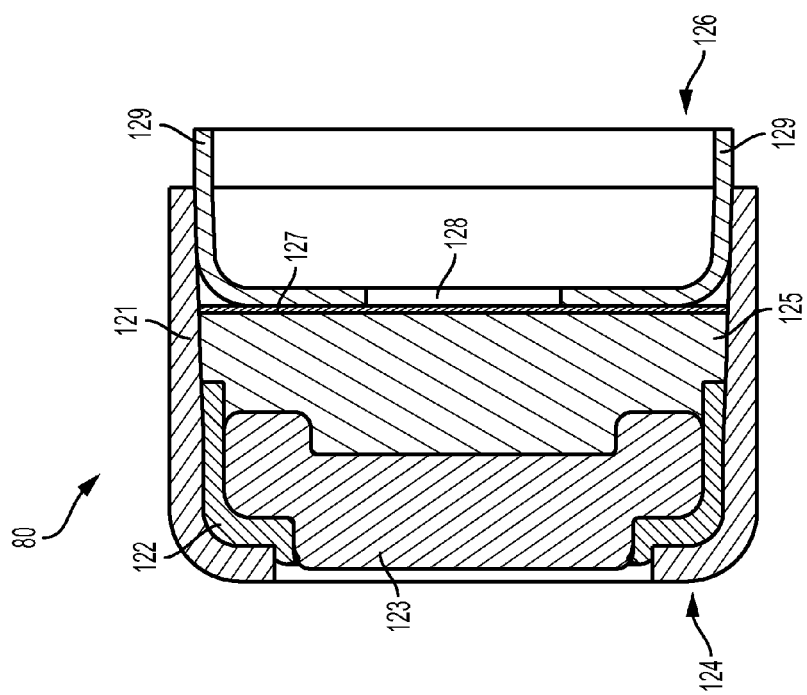
FIG. 4B
FIG. 4A

APPARATUS AND ELECTRIC PRIMER OUTPUT DATA TESTING METHOD

CROSS-REFERENCE TO RELATED APPLICATIONS

This application claims the benefit of U.S. Provisional Application No. 61/984,995 filed Apr. 28, 2014, the entire disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (NC 103,257) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE DISCLOSURE

The present disclosure generally relates to a system and method for testing electrically initiated items, and more particularly to a system and method for testing an electric primer and an all up round (AUR).

BACKGROUND AND SUMMARY

An all up round (AUR) includes an assembled round or bullet comprised of, for example, a housing (cartridge), a primer, a projectile, and a propellant. Current test systems for AURs include instrumentation that measures parameters associated with firing the AUR such as case mouth pressure, velocity of the projectile, and action time, which is the time from when energy is applied to the primer of the bullet to when the projectile leaves the gun barrel muzzle. Current test systems for AURs are also known to test the propellant in the AUR. Some rounds include electric primers which are activated by an externally provided electric charge, as opposed to a mechanical impact. The electric primer in turn ignites the primary propellant. Existing testing equipment for AURs is unable to test the electric primer functionality. Further, existing test equipment is unable to control an application of required voltages in varied durations to the electric primer of the AUR.

In primers used in ammunition for rapid fire cannon guns, including guns having multiple revolving barrels, a need exists to detect the causes of a long action time that exceeds a maximum action (dwell) time. The maximum action time varies depending on the gun and ammunition configuration. One example of a maximum action time is about 570 microseconds for a 20 mm gun, although other suitable maximum action times may be required. An action time lasting longer than the maximum action time may cause damage to the gun.

A method and apparatus is provided that allows control of an applied voltage, duration, and resistance to initiate an electric primer and monitor output characteristics of either the primer or the AUR. The apparatus and method control several key elements with high specificity, including, for example, the applied voltage magnitude, the length of time voltage is applied (microsecond pulse duration), the number of voltage pulses, and an in-line resistance applied to the bullet's primer.

The present disclosure includes an apparatus and method for functionally testing electrically initiated items, such as primers, for temperature and pressure data. According to an illustrative embodiment of the present disclosure, an exemplary testing method is capable of determining a primer's pressure and temperature, while applying voltage to a cartridge's primer and controlling factors including varying degrees of voltage, pulse duration, number of pulses, and in-line resistance. The temperature and pressure data provide an indication of the dynamics of the primer's reaction to a firing pulse.

According to a further illustrative embodiment of the present disclosure, an apparatus is capable of testing for pressure, velocity, and action time in relation to, for example, an AUR, and in addition, testing temperature and pressure in relation to primer-only function while also subjecting the AUR or primer to varying degrees of voltage, pulse duration, number of pulses, and in-line resistance. Various embodiments can have different attributes or elements/steps.

According to a further illustrative embodiment of the present disclosure, an apparatus has been created capable of controlling various testing methods of an AUR and primer-only cartridge function.

In an exemplary embodiment of the present disclosure, a system is provided including at least one processor, a first section including a testing apparatus adapted to hold and initiate an electrically initiated gas generator initiator, and a second section coupled to the testing apparatus and operable to generate and selectively control an electrical firing signal to the initiator based on a plurality of firing signal input parameters. The plurality of firing signal input parameters comprise a voltage of the electrical firing signal and at least one of a pulse duration of the electrical firing signal and a number of pulses of the electrical firing signal. The system includes a third section comprising an input/output section including a user interface, and the user interface includes a display adapted to display a graphical user interface. The system includes a fourth section comprising a test fixture and an electrical characteristic measurement section operable to measure a plurality of parameters including voltage and current associated with the electrical firing signal. The test fixture comprises a housing adapted to couple to the testing apparatus. The fourth section further includes at least one of a pressure sensor and a temperature sensor coupled to the test fixture. The test fixture includes at least one internal port for receiving the at least one of the pressure sensor and the temperature sensor, and the electrically initiated gas generator initiator is positioned in the housing of the test fixture. The system further includes a machine instruction storage section comprising a plurality of machine readable instructions that when executed by the at least one processor cause the at least one processor to: generate a test selection prompt requesting a user to select one of a first test and a second test and configure at least the second section based upon a user selection of the first test; obtain the plurality of firing signal input parameters and configure at least the second section for the first test based on the plurality of firing signal input parameters; and execute the first test by generating a first user control trigger prompt, initiating sending a first firing activation signal to the second section in response to a user selection of the first user control trigger prompt, collecting the plurality of parameters from the fourth section generated during the first test, and displaying a graphical interface section on the display comprising electrically initiated gas generator initiator data. The electrically initiated gas generator initiator data includes temperature and pressure generated during the first test.

In another exemplary embodiment of the present disclosure, a test system is provided including at least one processor and a first section comprising a holder adapted to hold an electrically activated gas generator initiator positioned within a gas generator charge housing. The initiator is activated by application of at least one firing control signal. The system includes a second section comprising a power supply, a function generator, and a switch operable to selectively generate the at least one firing control signal based on a plurality of firing signal input parameters. The system includes a third section comprising test instrumentation operable to measure at least one of a pressure output and a temperature output from the gas generator initiator and to measure at least one of current data and voltage data during a test. The system includes a fourth section including an input/output section operable to receive user inputs and to output a plurality of outputs. The system further includes a fifth section comprising a machine readable storage section adapted to store a plurality of machine readable instructions operable for controlling the test system. The plurality of machine readable instructions when executed by the at least one processor cause the at least one processor to: receive a plurality of user inputs including user selection of a type of test and the plurality of firing signal input parameters; perform an initial configuration of at least the second section based on the plurality of firing signal input parameters; execute the test by operating the second section to generate the at least one firing control signal so as to activate the initiator and by operating the third section to collect the at least one of the pressure output and the temperature output and the at least one of current data and voltage data during activation of the initiator; and provide graphical user interface data to the fourth section for displaying the at least one of the pressure output and the temperature output and the at least one of current data and voltage data generated during the test.

In yet another exemplary embodiment of the present disclosure, a method of testing includes providing a first section comprising a holder adapted to hold an electrically activated gas generator initiator positioned within a gas generator charge housing. The initiator is configured to activate by application of at least one firing control signal comprising an electrical signal. The method includes providing a second section comprising a power supply, a function generator, and a switch operable to selectively generate the at least one firing control signal based on a plurality of firing signal input parameters. The method includes providing a third section comprising a test instrumentation operable to measure at least one of a pressure output and a temperature output from the gas generator initiator and to measure at least one of current data and voltage data during a test. The method includes providing a fourth section including an input/output section operable to receive user inputs and output a plurality of outputs. The method includes receiving a plurality of user inputs including user selection of a type of test and the plurality of firing signal input parameters and performing an initial configuration of at least the second section based on the plurality of firing signal input parameters. The method includes executing the test by operating the second section to generate the at least one firing control signal so as to activate the initiator. The method includes operating the third section to collect the at least one of the pressure output and the temperature output and the at least one of current data and voltage data during activation of the initiator. The method further includes generating graphical user interface data for display on the fourth section comprising the at least one of the pressure output and the temperature output and the at least one of current data and voltage data generated during the test.

In still another exemplary embodiment of the present disclosure, a method of testing includes providing a control section comprising a programmable DC power supply, a function generator, and a switch operable to selectively generate a firing control signal. The method includes providing an oscilloscope operable to measure the firing control signal. The method includes selecting a voltage amplitude on the programmable DC power supply. The method includes inserting a cartridge into a cartridge port of a test vessel and coupling the test vessel with the cartridge to a firing breech, and the cartridge includes a primer. The method includes positioning at least one of a pressure transducer and a temperature sensor in the cartridge proximate the primer. The method includes selecting at least one input parameter for the firing control signal. The at least one input parameter includes at least one of a pulse duration and a number of pulses associated with the firing control signal. The method includes activating the primer by applying the firing control signal to the primer. The method further includes collecting and displaying on a display data based on output from the at least one of the pressure transducer and the temperature sensor.

Additional features and advantages of the present disclosure will become apparent to those skilled in the art upon consideration of the following detailed description of illustrative embodiments.

BRIEF DESCRIPTION OF THE DRAWINGS

The embodiments will be more readily understood in view of the following description when accompanied by the below figures and wherein like reference numerals represent like elements:

FIG. 4A illustrates a cross-sectional view of an exemplary electric primer according to some embodiments;

FIG. 4B illustrates an end view of the electric primer of FIG. 4A;

DETAILED DESCRIPTION OF THE DRAWINGS

The embodiments described herein are not intended to be exhaustive or to limit the invention to precise forms disclosed. Rather, the embodiments selected for description have been chosen to enable one skilled in the art to practice the invention.

Figure 1:
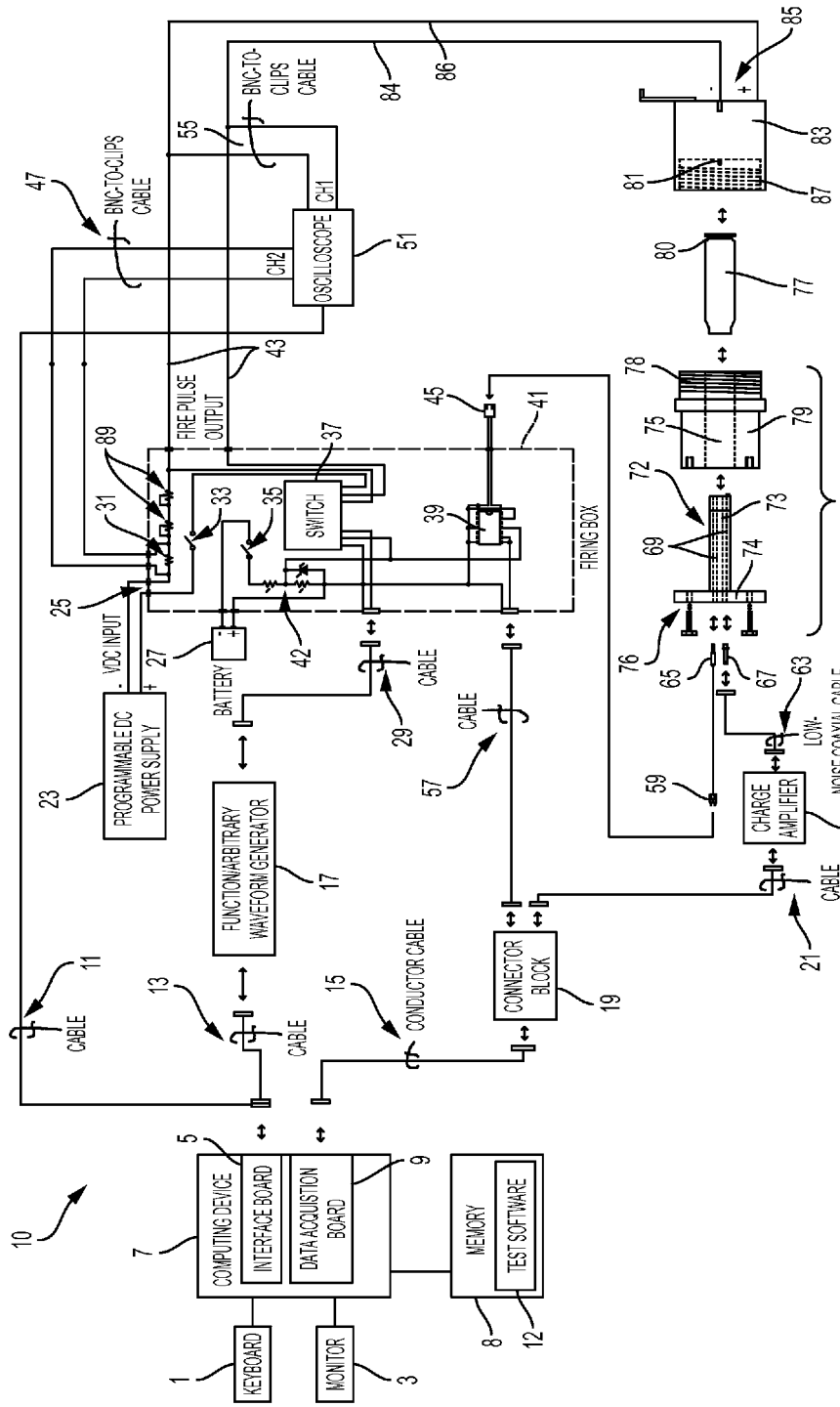
FIG. 1 illustrates an exemplary embodiment of a testing system for performing an all up round (AUR) test or a primer test.

Referring initially to FIG. 1, an exemplary schematic of a testing system 10 is depicted for a function test of an electrically initiated item, for example, a primer function test or an all up round (AUR) function test, according to some embodiments. Test system 10 is operative to provide instrument control, data handling, and file I/O functionality for a primer and AUR function test.

For the primer test, test system 10 includes a test fixture 71 that is configured to couple to a firing breech or holder apparatus 83 for testing the functionality of a primer, as described herein. Firing breech 83 includes a structure that contains a firing pin 81 for delivering the firing pulse to the primer. In the primer test, a cartridge 77 of a round including a primer 80 is inserted into test fixture 71 for testing, with the projectile and propellant removed from cartridge 77. Test system 10 is also operative to conduct an AUR test, as described herein. In the AUR test, a projectile barrel is coupled to a firing breech, such as firing breech 83, and test system 10 fires the AUR (the assembled cartridge, primer, projectile, and propellant) while monitoring parameters associated with the firing of the AUR. In the AUR test, test fixture 71 is not used and the AUR projectile associated with a cartridge (e.g., cartridge 77) is fired through the projectile barrel during the test. The projectile barrel may include a replica of a gun barrel that is configured to attach to firing breech 83. As such, while FIG. 1 illustrates a primer test configuration with test fixture 71, the AUR test configuration uses the full length barrel (e.g., see cutaway portion 54 of full length barrel in FIG. 19) rather than the test fixture 71 with firing breech 83.

Figure 19:
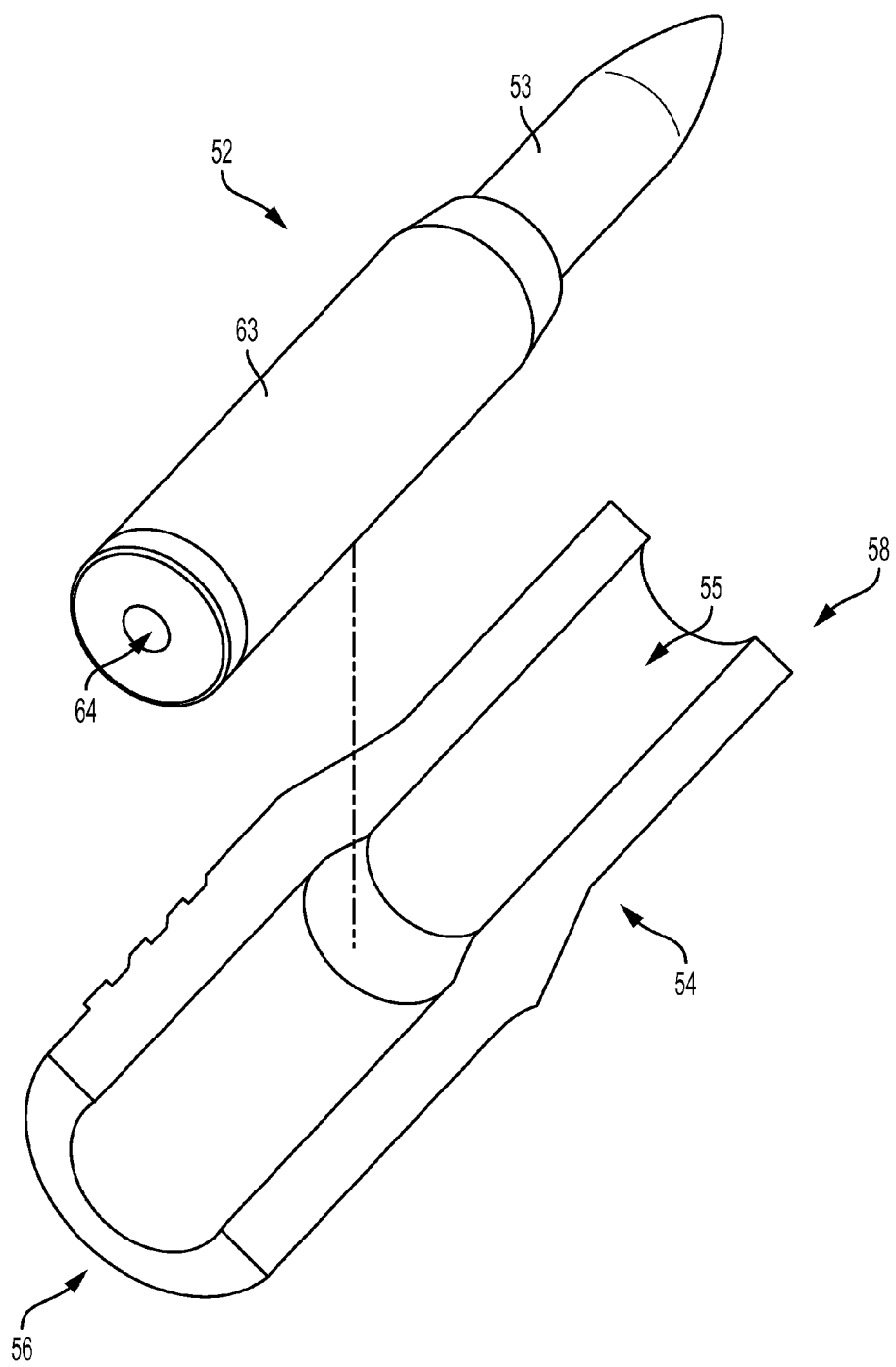
FIG. 19 illustrates a perspective view of an exemplary all up round (AUR) and a cutaway gun barrel for use with the testing system of FIG. 1.

An exemplary AUR 52 is illustrated in FIG. 19. Referring to FIG. 19, AUR 52 includes a cartridge or shell 63, an electric primer 64, a projectile 53, and a propellant (not shown) contained in the cartridge 63. In one embodiment, cartridge 63 and primer 64 have a same configuration as respective cartridge 77 and primer 80 of FIG. 1 used in the primer only test. When a firing pulse activates primer 64, primer 64 causes the propellant to ignite to thereby fire the projectile 53. A cutaway view of an exemplary barrel portion 54 is also illustrated in FIG. 19 including a barrel opening 55 for receiving AUR 52. Barrel portion 54 is cut off in length (at second end 58) and in width for illustrative purposes but may have a length of several feet. In one embodiment, barrel portion 54 is a test barrel configured to couple to a firing breech (e.g., firing breech 83 of FIG. 1) for performing an AUR test. A first end 56 of barrel portion 54 is configured to couple to the firing breech 83 (FIG. 1) such that firing pin 81 (FIG. 1) of breech 83 engages primer 64.

Referring again to FIG. 1, test system 10 includes a user interface, illustratively a keyboard 1 and a monitor 3, for receiving user inputs and communicating output data to a user. In one embodiment, computing device 7 provides a graphical user interface on monitor 3 for displaying test data, control inputs, and other suitable display data. Other suitable user interfaces may be provided, including a touchscreen and a mouse pointer device. Computing device 7 is coupled to the user interface and includes one or more processors. Test software 12 is stored in internal or external memory 8 of computing device 7 and is executed by the one or more processors to perform the testing functionality described herein. In the illustrated embodiment, test software 12 of computing device 7 includes an operating system and primer/AUR test software stored on an internal or external storage medium 8. In one embodiment, test software 12 includes LabVIEW® software provided by National Instruments, although other suitable test software may be provided. Computing device 7 is operative to control function generator 17, oscilloscope 51, and data acquisition card 9.

Computing device 7 includes an interface board 5, illustratively a General Purpose Interface Board (GPIB) 5, and a data acquisition board 9 each in communication with the executed test software 12. In one embodiment, interface board 5 is an IEEE STD 488 interface card. Interface board 5 provides a communication interface between computing device 7 and various components of test system 10, including a function generator 17 and an oscilloscope 51, for example. An exemplary interface board 5 is a PCI-PCIB from National Instruments, and an exemplary data acquisition board 9 is PCI-6115 from National Instruments, although other suitable boards 5, 9 may be provided. Data acquisition board 9 is connected to a pressure transducer 67 and a temperature sensor 65 via a connector block 19. Pressure transducer 67 and temperature sensor 65 are configured to provide signals representative of pressure and temperature, respectively, of primer 80 during the primer function test, and data acquisition board 9 captures and routes the signals to appropriate memory of computing device 7. An exemplary temperature sensor 65 is a self-eroding thermocouple whose output is amplified by an amplifier integrated circuit (e.g., amplifier 39). Various communication cables, e.g., cables 11, 13, 15, 21, 29, 47, 55, 57, and 63 (e.g., low noise cable), etc. are used to couple various components of testing system 10 together.

Arbitrary waveform/signal generator 17 and multi-channel oscilloscope 51 are connected to computing device 7 via the GPIB interface card 5. Arbitrary waveform/signal generator 17 is connected to a firing box or apparatus 41 via cable 29. Although function generator 17 is illustrated as a standalone component in FIG. 1, in other embodiments function generator 17 may be incorporated in firing box 41 or computing device 7. In the illustrated embodiment, firing box 41 (depicted by dashed lines) is operative to control the application of the firing pulse from signal generator 17 to firing breech 83 as well as amplify sensor output signals such as the temperature signal. In the illustrated embodiment, firing box 41 contains a safe/arm key switch 33, a power switch 35, and a high speed/high voltage switch 37 operable to rapidly output high voltage firing pulses based on the signal generated by signal generator 17. In one embodiment, switch 37 is a 500 VDC, 3 Ampere (A) switch, although other suitably rated switches may be provided. In one embodiment, switch 37 is operative to provide high voltage firing pulses having a magnitude ranging between zero volts and 500 volts and a duration ranging between one and a 1000 microseconds. Other minimum/maximum voltage magnitudes and durations may be provided. A fire pulse output 84, 86 from switch 37 is routed through conductors 43 coupled to firing box 41 via connectors 91 (FIG. 2) to electrical connectors 85 coupled to firing breech 83.

Firing box 41 further includes an amplifier 39 operative to amplify a small voltage (or current) signal received from thermocouple 65 to a level that can be accurately measured by data acquisition board 9. A circuit 42, illustratively including resistors and a Zener diode, is operative to regulate power input to amplifier 39 and to switch 37. A current viewing/current limiting resistor 31 of firing box 41 is operative to provide circuit protection by limiting current through box 41 and to provide current/voltage monitoring capability for oscilloscope 51 on a first channel of oscilloscope 51, e.g., the current being delivered to the firing pulse. Oscilloscope 51 is further operative to monitor the firing pulse output voltage (84, 86) delivered to primer 80 on a second channel.

Potentiometers 89 are configured to create in-line resistance between the pulse output and primer 80 that is variable by a user, as described herein. Programmable DC power supply 23 is connected to firing box 41 via connectors 25 to provide VDC power for the firing pulse. A battery 27 is also coupled to firing box 41 to supply VDC power to switch 37 and amplifier 39 of firing box 41. An exemplary battery 27 is a 6 VDC lantern battery, although other suitable batteries may be provided. In one embodiment, oscilloscope 51 and DC power supply 23 are coupled to firing box 41 via banana jack connectors.

In the illustrated embodiment, high speed/high voltage switch 37 is controlled by waveform/signal generator 17. In one embodiment, the output of waveform/signal generator 17 is also routed to and captured by data acquisition card 9. Oscilloscope 51 monitors the firing voltage routed through conductors 43. An exemplary oscilloscope 51 is a model DSO6014A oscilloscope provided by Agilent Technologies, Inc. Firing pulses routed from firing box 41 to firing breech 83 include a positive (+) firing pulse 84 and a negative (−) firing pulse 86. In the illustrated embodiment, oscilloscope 51 is connected to the conductors 43 of (+) firing pulse 84 and (−) firing pulse 86 for monitoring on the first channel. Oscilloscope 51 is further operative to provide monitored waveform data to computing device 7 via cable 11.

Test fixture 71 of FIG. 1 includes a test vessel or "test bomb" 79, a sensor mount 72, and a plurality of fasteners (e.g., screws) 76 for coupling sensor mount 72 to test vessel 79. In the illustrated embodiment, firing breech 83 includes a threaded end 87 configured to receive a corresponding threaded end 78 of test vessel 79. Firing breech 83 further includes a spring-loaded firing pin 81 that routes the firing pulse from firing box 41 to primer 80. Firing pin 81 is illustratively centered in the opening formed in threaded end 87 for contacting primer 80 to deliver the firing pulse to primer 80. In the illustrated embodiment, threaded end 87 of breech 83 is opposite an end of firing breech 83 containing the connectors 85 that receive the input firing pulses.

Sensor mount 72 of test fixture 71 includes a head portion 74 for receiving screws 76 and an elongated portion 73. Thermocouple 65 and pressure transducer 67 are coupled at the distal end of elongated portion 73 opposite head portion 74. Elongated portion 73 includes a pair of sensor ports 69 routed internally along a longitudinal axis of elongated portion 73 for routing electrical conductors to thermocouple 65 and pressure transducer 67. When sensor mount 72 is fixed to test vessel 79, elongated portion 73 is sized to position sensors 65, 67 adjacent primer 80 inside of cartridge 77 for measuring the temperature and pressure of primer 80 during a firing event. In one embodiment, elongated portion 73 includes one or more standoff screws at its distal end for coupling to test vessel 79.

To test primer 80, cartridge 77, containing primer 80 but with the projectile and propellant removed, is inserted into a cartridge port (opening) 75 of test vessel 79. Test vessel 79 is then affixed to firing breech 83 at threaded end 78. Sensor mount 72 is fastened to test vessel 79 to position thermocouple 65 and pressure transducer 67 adjacent primer 80.

Pressure transducer 67 is connected to a charge amplifier 61 which is connected to connector block 19 via cable 21, and connector block 19 is connected to data acquisition board 9 via cable 15. Charge amplifier 61 serves to amplify the signal output from pressure transducer 67 to a level readable by data acquisition board 9. Thermocouple 65 is connected to amplifier 39, i.e., to allow a small voltage received from the thermocouple material to be amplified to a level that may be accurately measured by data acquisition board 9 of computing device 7. In one embodiment, amplifier 39 includes an integrated circuit. In the illustrated embodiment, amplifier 39 is positioned inside firing box 41.

In the illustrated embodiment, computing device 7 executes testing software 12 to control and interact with firing box 41 and test fixture 71 in such a way as to collect data on primer pressure, primer temperature, voltage and current applied to primer 80 (monitored via oscilloscope 51), and input voltage/current to firing box 41, while controlling the applied voltage magnitude, pulse duration, number of pulses, and in-line resistance applied to specified levels or amounts.

Figure 2:
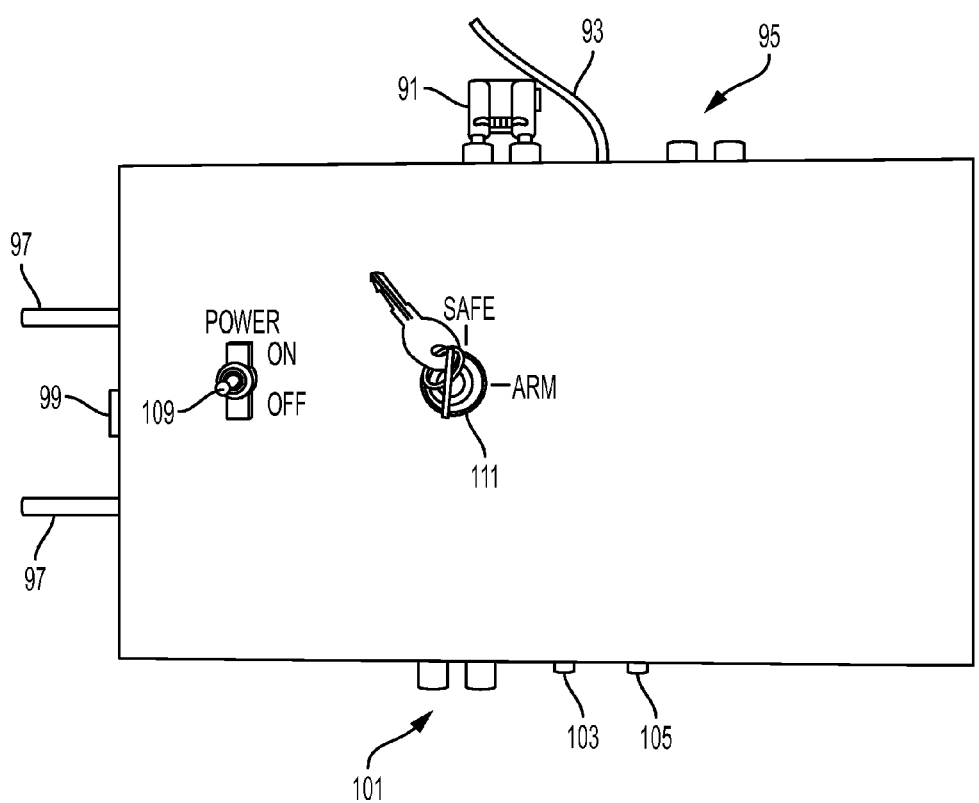
FIG. 2 illustrates an external view of an exemplary embodiment of a firing box of the testing system of FIG. 1.

Referring to FIG. 2, an exemplary embodiment of an outside of a firing box (e.g., firing box 41 of FIG. 1) is illustrated. In this embodiment, the firing box includes input and output features such as a firing voltage output 91, a thermocouple signal input 93, a battery power input 95, a thermocouple signal output 105, a function generator input 103, a direct current (DC) power supply input 101, a firing current connector 99, and an inline resistance adjustment 97. These features interact with other sections of the exemplary testing system, including testing software, operable for controlling testing variables, energy, and data, etc.

In particular, firing voltage output 91 includes a pair of electrical connectors for coupling electrical cables (e.g., conductors 43 of FIG. 1) that route the firing pulses to firing breech 83 of FIG. 1. Thermocouple signal input 93 includes an electrical connector that receives the thermocouple signal from connector 45 (FIG. 1), and thermocouple signal output 105 includes a connector that routes the thermocouple signal amplified by amplifier 39 (FIG. 1) to a connected cable 57 (FIG. 1) for receipt by data acquisition board 9 of computing device 7. Battery power input 95 includes positive and negative terminal connectors for connection of battery power, such as power from battery 27 of FIG. 1, for powering components of the firing box. DC power supply input 101 illustrates exemplary connectors 25 of FIG. 1 for routing VDC power from DC power supply 23 (FIG. 1) for the firing pulse output. Function generator input 103 includes an electrical connector for receiving the signal generated by waveform/signal generator 17 (FIG. 1) and routing the signal to switch 37 (FIG. 1) of the firing box. Inline resistance adjustment inputs 97 illustratively include a pair of rotatable knobs or handles. A user's adjustment of the rotational position of inputs 97 causes adjustment of the pair of potentiometers 89 of FIG. 1 to thereby adjust the inline resistance. In one embodiment, the inline resistance simulates a total inline resistance between the output of a firing pulse generator in a gun and the primer of the bullet. The inline resistance is varied to control the characteristics of the voltage delivered to primer 80, as described herein. Firing current connector 99 includes an electrical connector to allow current flow to a fired primer 80 to be monitored by oscilloscope 51, such as at resistor 31 of FIG. 1.

Referring still to FIG. 2, the exemplary firing box further includes an on and off switch input 109 and a safe and arm key input 111. On/off switch input 109 illustratively includes a toggle switch for controlling the on/off power switch 35 of firing box 41 of FIG. 1. Safe and arm key input 111 includes a key assembly for controlling the position of the safe/arm key switch 33 of FIG. 1. As such, a key is required to enable power to the firing box.

Figure 3:
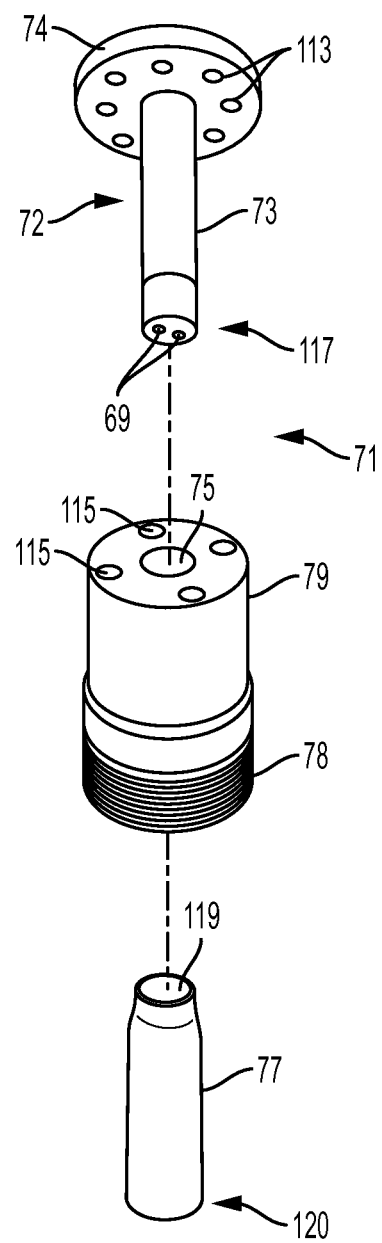
FIG. 3 illustrates an exemplary test assembly used in the testing system of FIG. 1, including a test fixture and a cartridge having a primer.

Referring to FIG. 3, an exemplary test fixture 71 of FIG. 1 is illustrated including T-shaped sensor mount 72 and test vessel 79. Head portion 74 of sensor mount 72 and test vessel 79 each include spaced apertures 113, 115 for receiving fasteners 76 (FIG. 1). Pressure transducer 67 and thermocouple 65 of FIG. 1 are positioned in ports 69 at distal end 117 of elongated portion 73. With cartridge 77 positioned in opening 75 of test vessel 79, elongated portion 73 is positioned in opening 119 of cartridge 77 such that pressure transducer 67 and thermocouple 65 are positioned inside cartridge 77 near or abutting primer 80 (FIG. 1) positioned at end 120 of cartridge 77. In one embodiment, cartridge 77 is a 20 millimeter (mm) cartridge, although other sizes of cartridge 77 may be provided. In one embodiment, test vessel 79 is a pressure vessel in which cartridge shell 77 is inserted such that primer 80 faces outwardly from threaded end 78 of test vessel 79 and the open end of cartridge 77 is aligned with a narrow open end of test vessel 79 for receiving elongated portion 73. Once cartridge 77 is inserted in test vessel 79, test vessel 79 is connected to firing breech 83 (FIG. 1) by screwing together threaded portions 87, 78 of firing breech 83 and test vessel 79, respectively.

Referring to FIGS. 4A and 4B, an exemplary primer 80 of cartridge 77 of FIG. 1 is illustrated. Primer 80 includes a non-conductive cup or outer casing 121 that is substantially cylindrical in shape with a U-shaped cross-section. A metal conductor or button 123 is located in cup 121, and an insulator 122 (e.g., rubber) is positioned between cup 121 and metal conductor 123. Cup 121 is open at a first end 124 of primer 80 to allow the firing pin (e.g., firing pin 81 of FIG. 1) to engage metal conductor 123. A primer fill or mix 125 is located in cup 121 between metal conductor 123 and a disc 127, which spans the interior width (diameter) of cup 121. A cup support member 129 is positioned in cup 121 over disc 127 at a second end 126 of primer 80. In the exemplary embodiment, pressure transducer 67 and thermocouple 65 (FIG. 1) are positioned adjacent disc 127 through opening 128 in support cup 129 when test fixture 71 and cartridge 77 (FIG. 1) are assembled for measuring the pressure and temperature of primer 80. In one exemplary embodiment, primer 80 has a resistance between 1,000 ohms and 1,000,000 ohms.

In one example, primer fill 125 is made of acetylene black, barium nitrate, calcium silicide, technical acacia (gum arabic), lead styphnate, and 2, 4, 6 trinitroresorcinol. In one example, cup 121, button 123, and support cup 129 are all made of conductive material and are insulated by insulator 122. In one example, insulator 122 is polyvinyl chloride/vinyl acetate copolymer modified. In one example, disc 127 is a paper material coated with shellac. Other suitable materials for primer 80 may be provided. In one embodiment, the firing voltage that reaches button 123, which is insulated from cup 121 and support cup 129 by insulator 122, is targeted to be sufficient to conduct through primer mix 125 and complete a circuit to cup 121, which functions primer mix 125 from the heat build-up.

Figure 5:
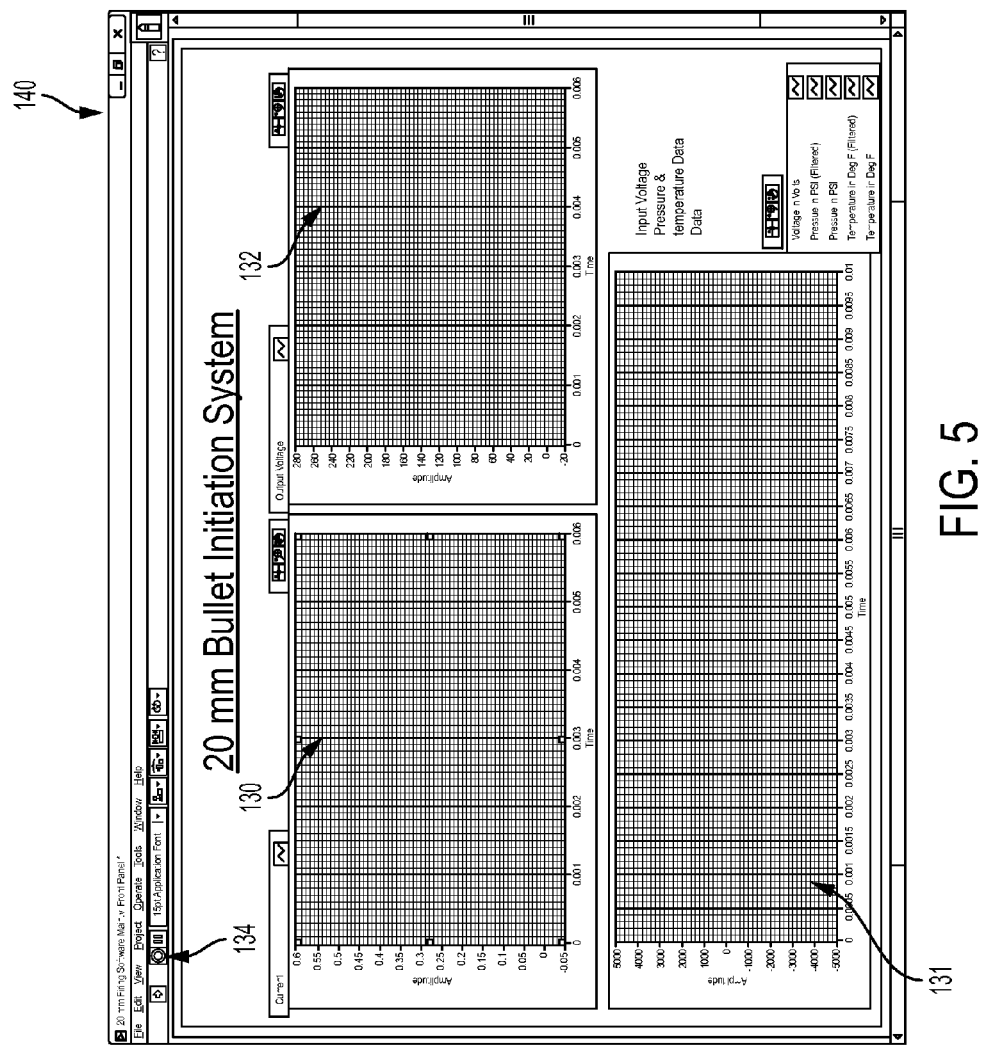
FIG. 5 illustrates a graphical user interface provided by a computing device of the testing system of FIG. 1 according to an illustrative embodiment of the present disclosure, the graphical user interface displaying a software test system front panel.

Referring to FIG. 5, a graphical user interface (GUI) 140 of test system 10 of FIG. 1 is illustrated according to some embodiments. GUI 140 is provided by computing device 7 for display on monitor 3 of FIG. 1. A user provides user input to GUI 140 via any suitable user input device coupled to computing device 7, such as keyboard 1 (FIG. 1), a touchscreen, pointing device (e.g., mouse), etc.

GUI 140 includes selectable data, such as selectable inputs, fields, modules, tabs, drop-down menus, boxes, and other suitable selectable data, that are linked to and provide input to the components of system 10 of FIG. 1. In one embodiment, the selectable data of GUI 140 is rendered in a manner that allows it to be individually selectable. For example, the selectable data is selected by a user with a mouse pointer, by touching a touchscreen of the user interface, by pressing keys of a keyboard (e.g., keyboard 1 of FIG. 1), or by any other suitable selection mechanism. GUI 140 further displays monitored data, including temperature, pressure, voltage, and current data, provided from components of system 10 that is displayed with the selectable data.

In the illustrated embodiment, GUI 140 includes an exemplary software test system front panel for a 20 mm bullet initiation system. Other caliber bullets or rounds may be tested, including AUR and primer only tests of varying calibers. GUI 140 displays a plurality of test data indicators. For example, a top left quadrant of GUI 140 includes a graph 130 of current applied to a primer versus time during a primer only or AUR test. A top right quadrant of GUI 140 includes a graph 132 of an output voltage applied to a primer versus time during the primer only or AUR test. A bottom portion of GUI 140 includes a graph 131 of temperature and pressure data versus time monitored during a primer only or AUR test. In one embodiment, temperature and pressure data displayed on graph 131 is displayed in raw form as well as after passing through a lowpass filter (e.g., 1000 Hz Lowpass Butterworth Filter) or other suitable filter. A menu bar 134 is provided which provides selectable user inputs such as start, pause, and stop functionality for testing operations.

Figure 6:
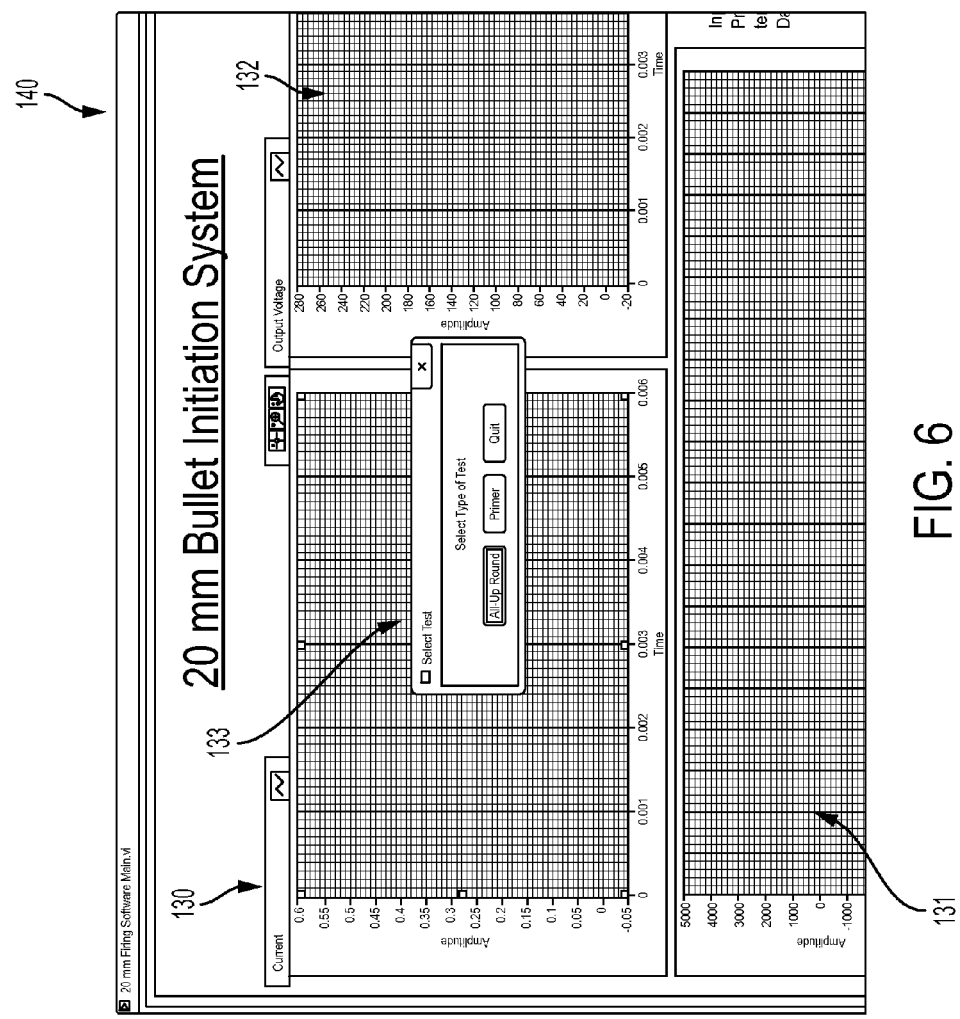
FIG. 6 illustrates an exemplary start up state menu of the graphical user interface of FIG. 5 for selecting a type of test.

Referring to FIG. 6, an exemplary start-up state menu 133 of GUI 140 is illustrated. Testing system 10 is activated by a user via a control menu run button of menu 134 (FIG. 5) which generates the active window 133 that prompts a user to select a type of test to be performed: for example, an AUR test or primer only test, or a user may quit software testing system.

Computing device 7 of FIG. 1 executes a software program, such as test software 12 of FIG. 1, to run the primer and AUR tests and to generate the GUI 140 of FIGS. 5 and 6. FIGS. 7-13 illustrate exemplary code modules of the testing software program executed by computing device 7. In the illustrated embodiment, the software program of FIGS. 7-13 is a LabView® program that uses a state machine type architecture, although other suitable programming languages may be used. Each program module of FIGS. 7-13 illustrates a different state of the software routine.

Figure 7:
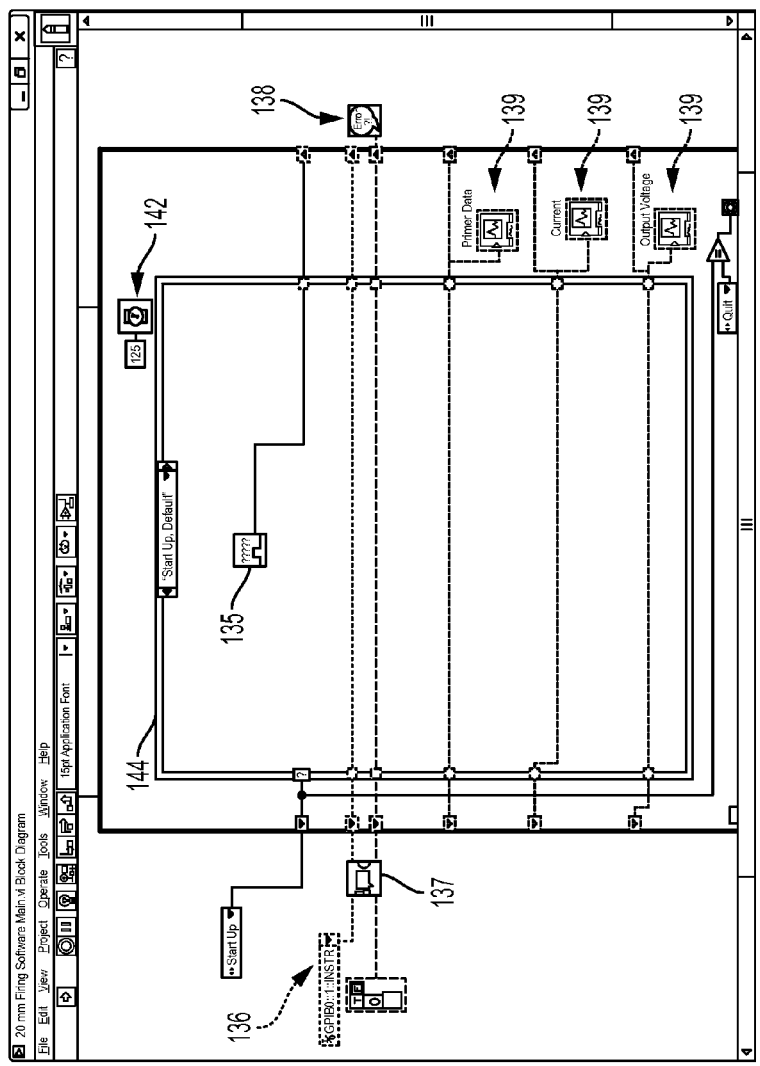
FIG. 7 illustrates an exemplary block diagram of a start-up state in an exemplary system-design platform and development environment for a visual programming language.

Referring to FIG. 7, an exemplary LabView® hierarchical block diagram of a start-up state 144 is depicted in an exemplary system-design platform and development environment for a visual programming language. Computing device 7 executes a case structure 135 (e.g., hierarchical block structures, lines, and shift register) that prompts a user for "Type of Test" (see prompt window 133 of FIG. 6), initiates a function generator control module 137 for initializing and controlling function generator 17 of FIG. 1, and at modules 139 either stores for later output or sends test data indicators (e.g., primer temperature and pressure data, current, output voltage) to the GUI 140 (FIGS. 5 and 6) once the user selects and runs a desired type of test in FIG. 6. Interface card 5 of FIG. 1 is also designated at block 136 to interface the test software 12 (FIG. 1) with the card 5. An error handling module 138 is also input into the model. A sub-visual instrument (VI) element may be included in the block diagram which initializes/enables the function generator 17 of FIG. 1. The block diagrams of FIGS. 7-13 include other features such as a wait function 142 which in this example causes the case register to wait a predetermined time, illustratively 125 milliseconds, between state changes in order to assist a user in comprehending and absorbing test data presented in the user interface graphs 130, 131, 132 of FIGS. 5 and 6. In other words, wait function 142 permits test data to be displayed for a threshold amount of time before a user prompt is generated.

Figure 8:
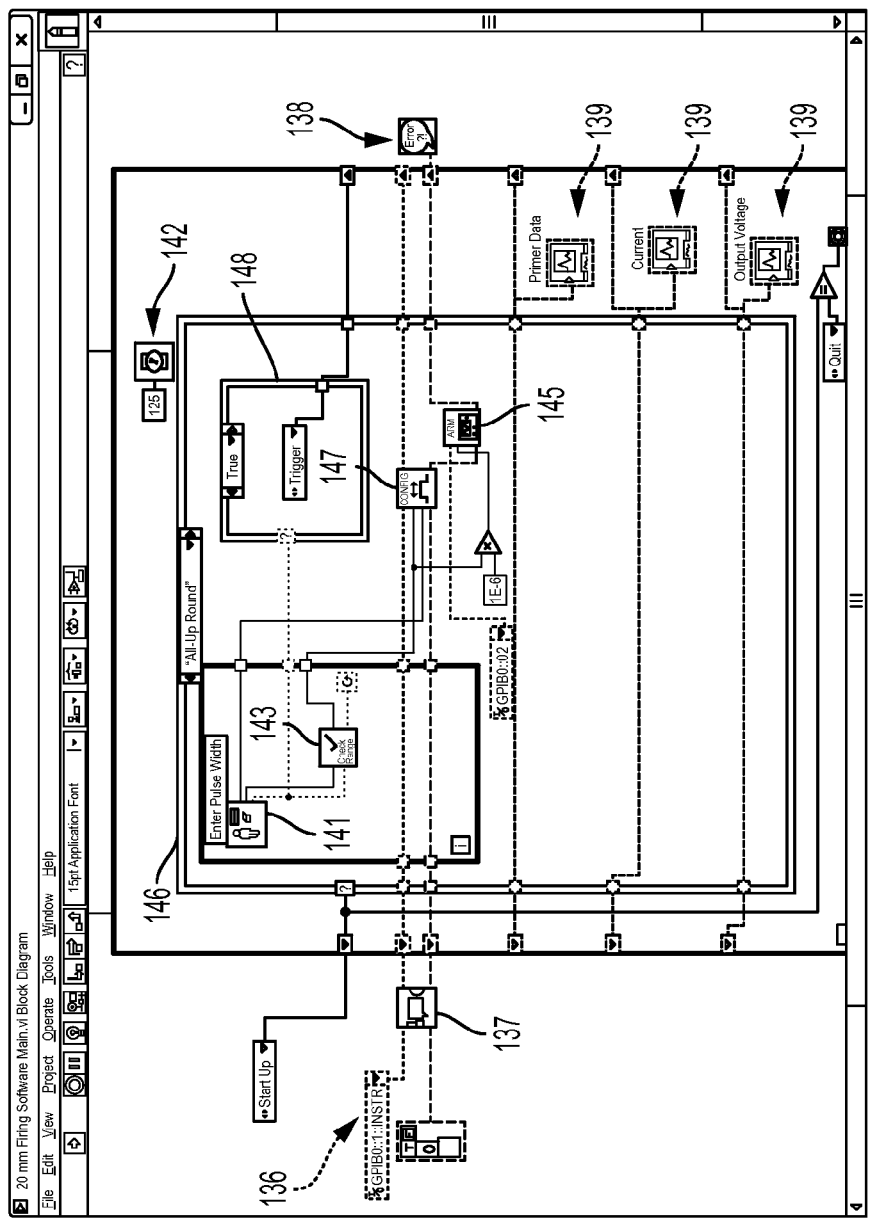
FIG. 8 illustrates an exemplary block diagram of a configuration state for an AUR test in an exemplary system-design platform and development environment for a visual programming language.

Referring to FIG. 8, an exemplary LabView® hierarchical block diagram for an AUR test configuration state 146 is depicted in an exemplary system-design platform and development environment for a visual programming language. AUR state 146 is operative to configure components of test system 10 to perform an AUR test. Computing device 7 executes a case structure that at block 141 prompts a user via GUI 140 (FIG. 5) for desired firing pulse parameters (e.g., desired voltage and voltage signal duration of firing pulse; also number of pulses in some embodiments). Upon receiving the desired pulse information via user input, computing device 7 confirms at block 143 that the user input pulse information is within an allowed range (e.g., a voltage magnitude range of 0 to 400 VDC and a voltage duration range of 1 to 1000 microseconds). At module 145, computing device 7 initializes and configures oscilloscope 51 of FIG. 1 to collect data, and in particular to collect waveform data of the voltage and current to be applied to the AUR.

At module 147, computing device 7 configures function generator 17 and firing box 41 of FIG. 1 to generate a voltage signal (firing pulse) at the desired magnitude and over the user specified duration. In one embodiment, the desired voltage duration is achieved by instructing switch 37 of firing box 41 (FIG. 1) to close for the specified duration. Computing device 7 may control switch 37 directly, or function generator 17 may control switch 37 based on instruction from computing device 7. In the illustrated embodiment, the actual firing pulse is not generated in state 146, but function generator 17, firing box 41, and oscilloscope 51 of FIG. 1 are prepared for the test. In one embodiment, modules 139 of FIG. 8 are configured to output the test data indicators immediately or to store the data and generate such output test data indicators in a subsequent state based on stored data.

Figure 9:
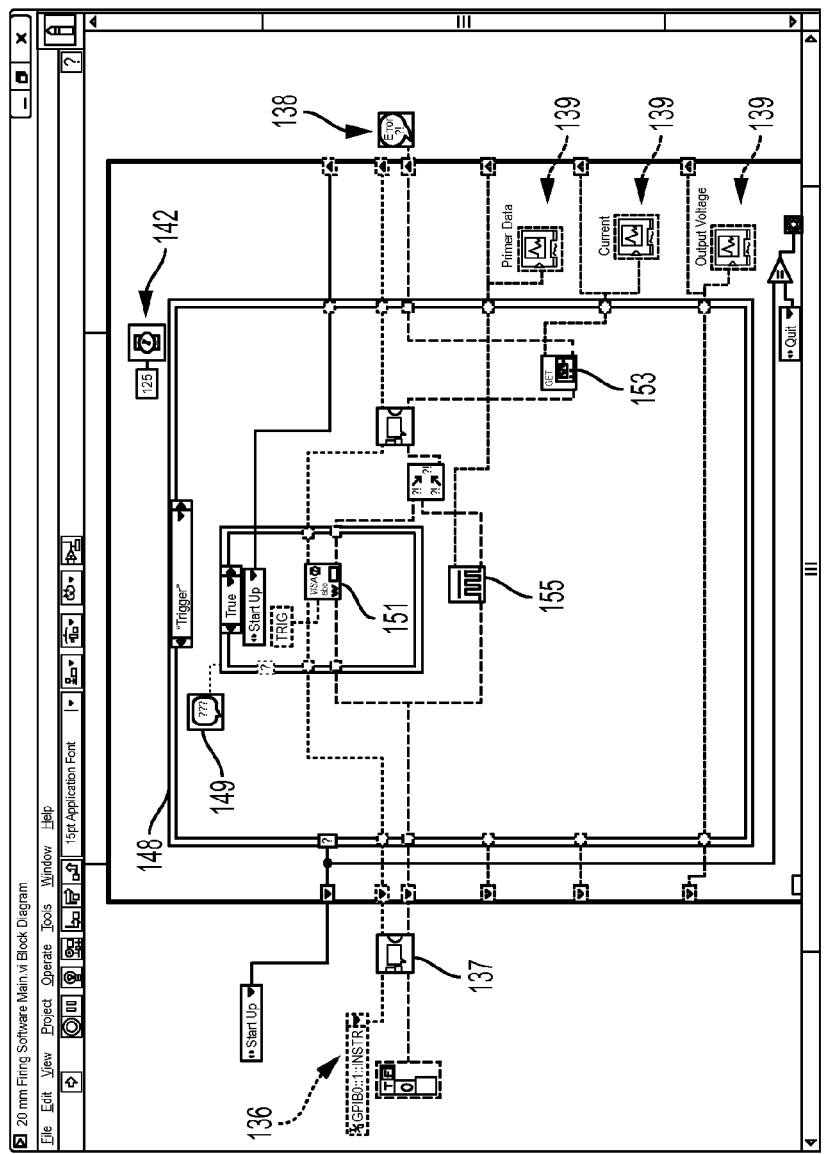
FIG. 9 illustrates an exemplary block diagram of a trigger state for an AUR test in an exemplary system-design platform and development environment for a visual programming language.

Referring to FIG. 9, an exemplary LabView® hierarchical block diagram for configuring and executing a trigger state 148 from FIG. 8 for triggering the AUR test is depicted in an exemplary system-design platform and development environment for a visual programming language. Computing device 7 at module 149 prompts the user for a trigger command via a prompt window of GUI 140 (FIG. 5). Upon receiving the trigger command, computing device 7 at module 151 sends the trigger command to function generator 17 of FIG. 1 which sends a voltage signal to firing box 41 of FIG. 1. At module 153, computing device 7 configures oscilloscope 51 (e.g., sample rate, record time, voltage range, vertical resolution, volts per division, etc.) and retrieves data from oscilloscope. The retrieved data is recorded via data acquisition device control module 155 (e.g., configures data acquisition board 9 of FIG. 1 to record the test data). In the AUR test of FIGS. 8 and 9, current applied over time to the AUR is measured and recorded as well as voltage applied to the AUR (e.g., via oscilloscope 51). In the AUR test of FIGS. 8 and 9, pressure and temperature data may or may not be measured. Additional data measured and recorded during the AUR test includes velocity of the projectile through the gun barrel, case mouth pressure, and action time. The inline resistance may also be adjusted during the AUR test with potentiometers 89 (FIG. 1).

Figure 10:
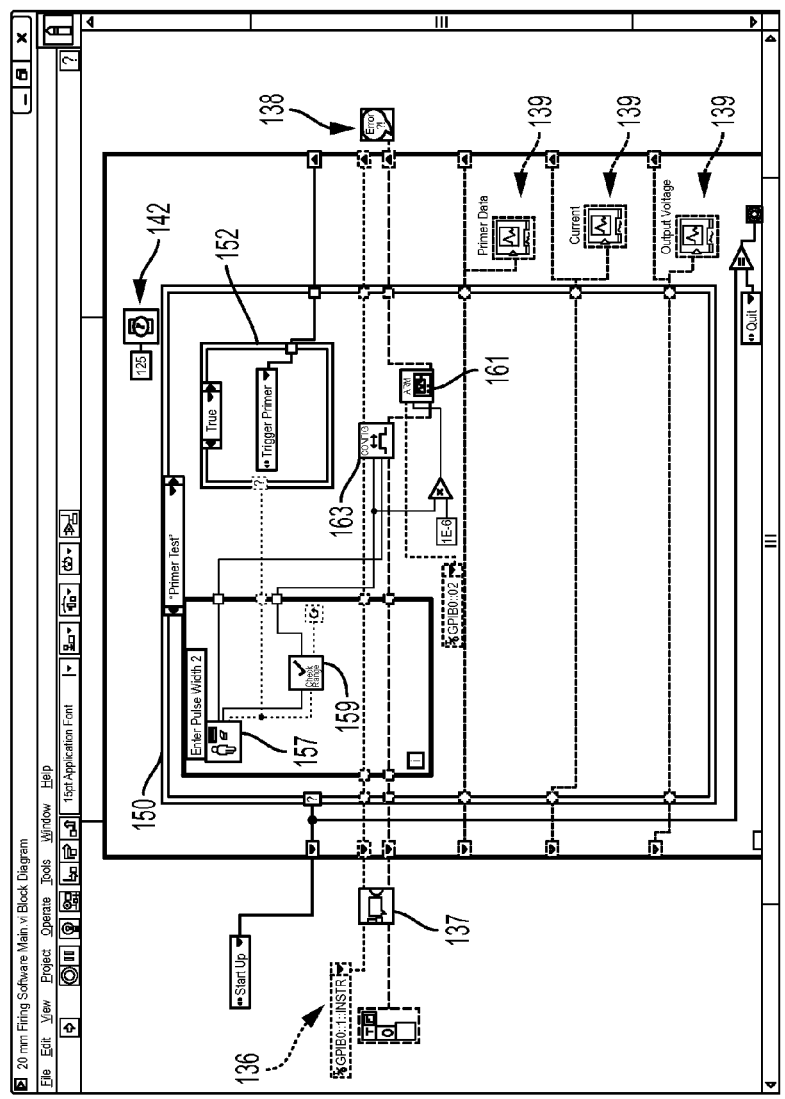
FIG. 10 illustrates an exemplary block diagram of a configuration state for a primer test in an exemplary system-design platform and development environment for a visual programming language.

Referring to FIG. 10, an exemplary LabView® hierarchical block diagram for configuration state 150 for a primer test is depicted in an exemplary system-design platform and development environment for a visual programming language. Computing device 7 receives the desired pulse parameters at module 157 from the user based on prompts via GUI 140 (e.g., selection of AUR test, primer only test, or quit; prompts for voltage magnitude, voltage signal duration, and number of pulses). At module 159, computing device 7 confirms the user input pulse information (e.g., voltage/voltage signal duration/number of pulses) is within the allowed ranges, as described above with respect to FIG. 8. At module 161, computing device 7 configures oscilloscope 51 of FIG. 1 to record data (e.g., sample rate, record time, voltage range, vertical resolution, volts per division, etc.). At module 163, computing device 7 configures function generator 17 of FIG. 1 for the primer test (e.g., sets a voltage and a voltage signal duration from the function generator). In one embodiment, the desired voltage duration specified by the user is achieved by instructing switch 37 of firing box 41 (FIG. 1) to close for the specified duration, as described above. In the illustrated embodiment, the actual firing pulse is not generated in primer test state 150, but function generator 17 and firing box 41 of FIG. 1 are prepared for generating the firing pulse at module 147. Data may or may not be recorded in the primer state 150 configuration process.

Figure 11:
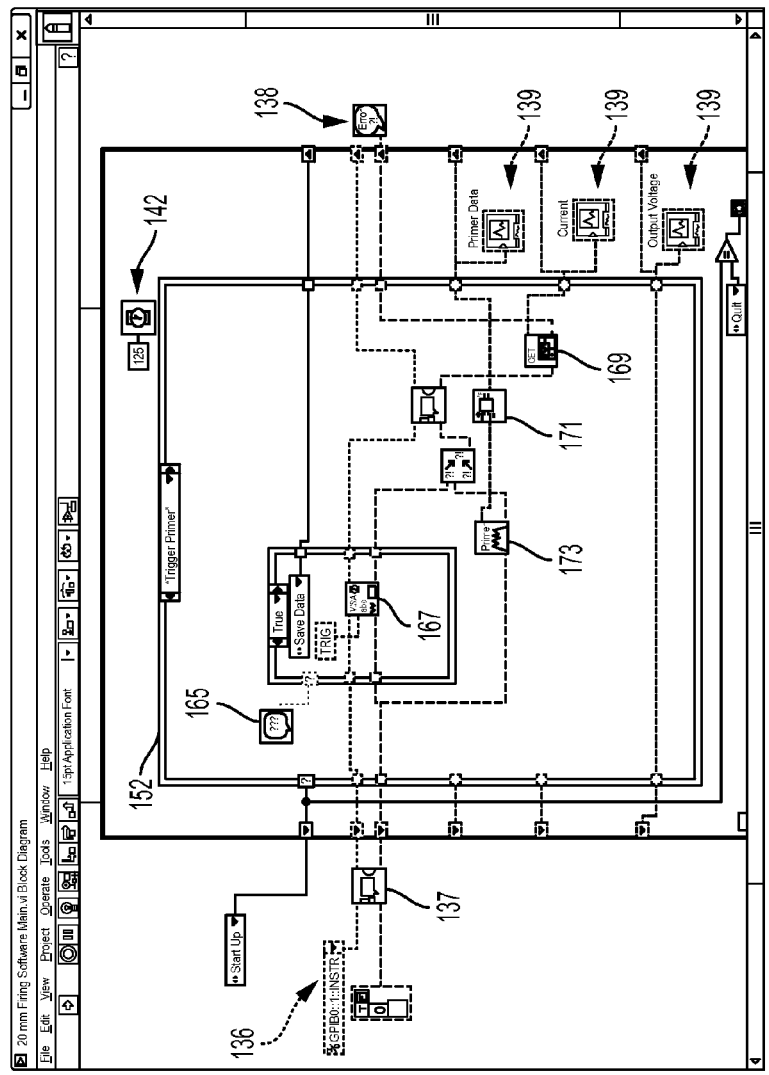
FIG. 11 illustrates an exemplary block diagram of a trigger state for a primer test in an exemplary system-design platform and development environment for a visual programming language.

Referring to FIG. 11, an exemplary LabView® hierarchical block diagram of executing the trigger primer state 152 from FIG. 10 is depicted in an exemplary system-design platform and development environment for a visual programming language. Computing device 7 at module 165 prompts the user for a trigger command via a prompt window of GUI 140 (FIG. 5). Upon receiving the trigger command, computing device 7 at module 167 sends the trigger command to function generator 17 of FIG. 1 which sends a voltage signal to firing box 41 of FIG. 1, and firing box 41 outputs the firing pulse to primer 80 based on the specified user input parameters. At block 169, computing device 7 collects current and voltage data (e.g., from oscilloscope 51) applied to primer 80 under test, applies at block 171 a transfer function to raw temperature data collected from temperature sensor 65 of FIG. 1, and collects at block 173 temperature and pressure data obtained from respective temperature sensor 65 and pressure transducer 67 of FIG. 1. The system also generates test data indicators (e.g., primer data (pressure and temperature), current applied to primer, output voltage applied to primer) for display on GUI 140 based on the captured data.

While the in-line resistance is described herein as being manually adjusted via input devices coupled to the firing box 41, in another embodiment computing device 7 is configured to prompt a user for a desired in-line resistance and to automatically adjust one or more potentiometers or variable resistors to achieve the desired in-line resistance. For example, in some embodiments the software modules described herein further include a resistance adjustment functionality to adjust the in-line resistance and thereby the input voltage/current firing pulse signals received by the electrically initiated gas generator (e.g., primer, cartridge, AUR, etc.).

Figure 12:
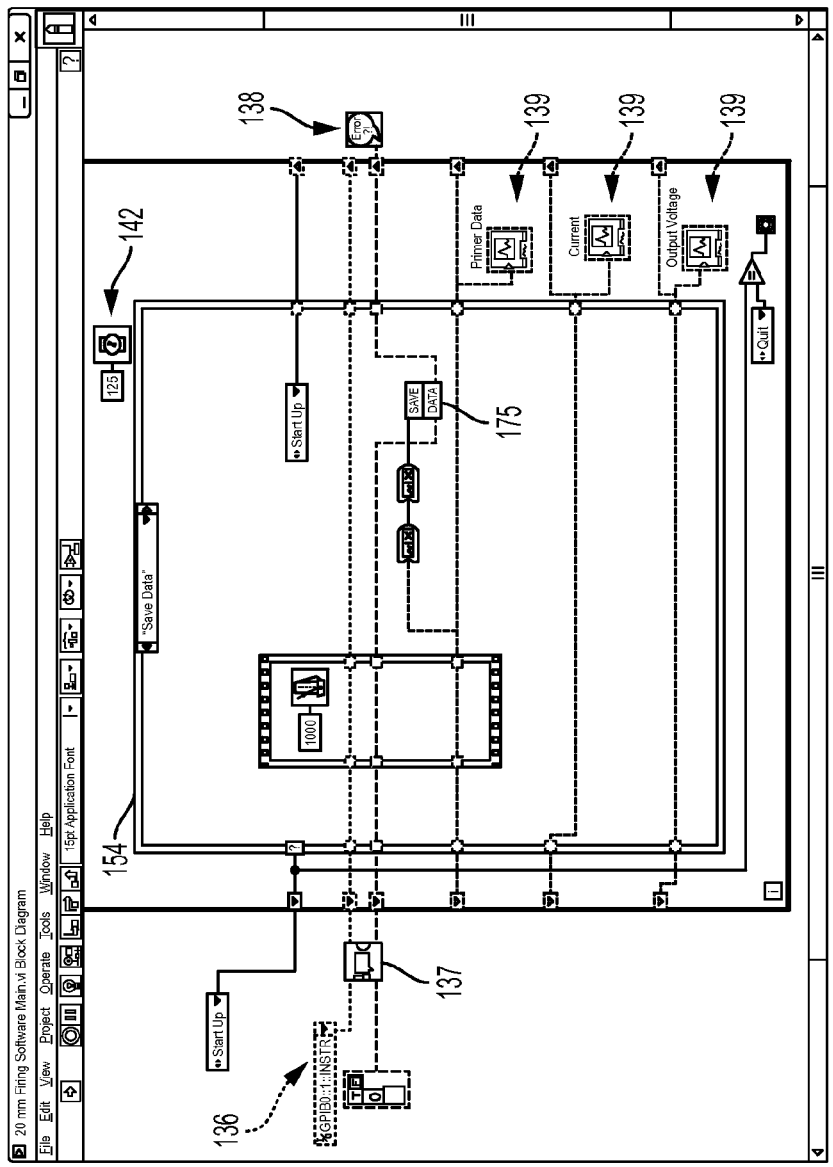
FIG. 12 illustrates an exemplary block diagram of a save data state in an exemplary system-design platform and development environment for a visual programming language.

Referring to FIG. 12, an exemplary block diagram of a save data state 154 is depicted in an exemplary system-design platform and development environment for a visual programming language. In this example, computing device 7 at block 175 saves data generated in other states, e.g., states of FIGS. 7 through 11, to a data file in memory 8 of FIG. 1. In one embodiment, the data is stored in an Excel® format.

Figure 13:
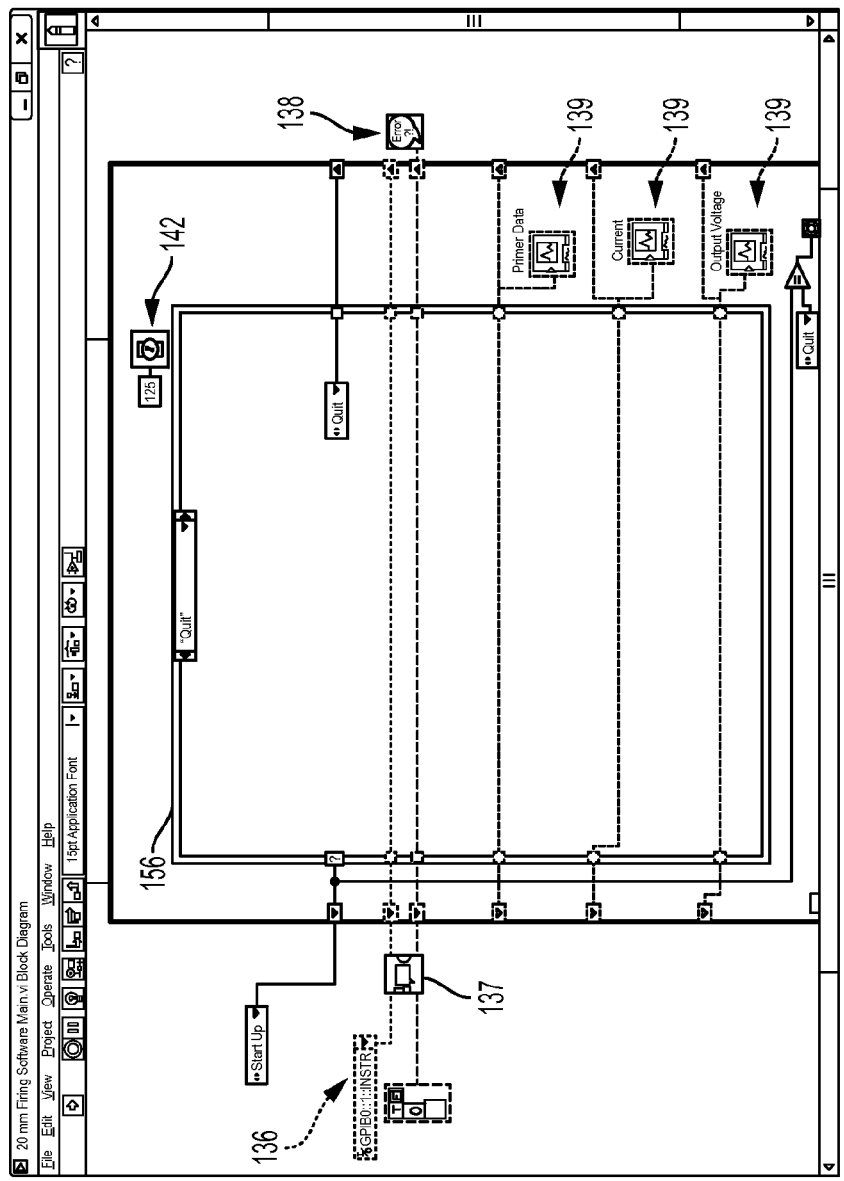
FIG. 13 illustrates an exemplary block diagram of a quit or exit state in an exemplary system-design platform and development environment for a visual programming language.

Referring to FIG. 13, an exemplary block diagram of a quit state 156 is depicted in an exemplary system-design platform and development environment for a visual programming language. Execution of the software testing program can be terminated and the program closed via the quit state 156. For example, user selection of the Quit input in the prompt 133 of FIG. 6 results in termination of the testing program.

Figure 14:
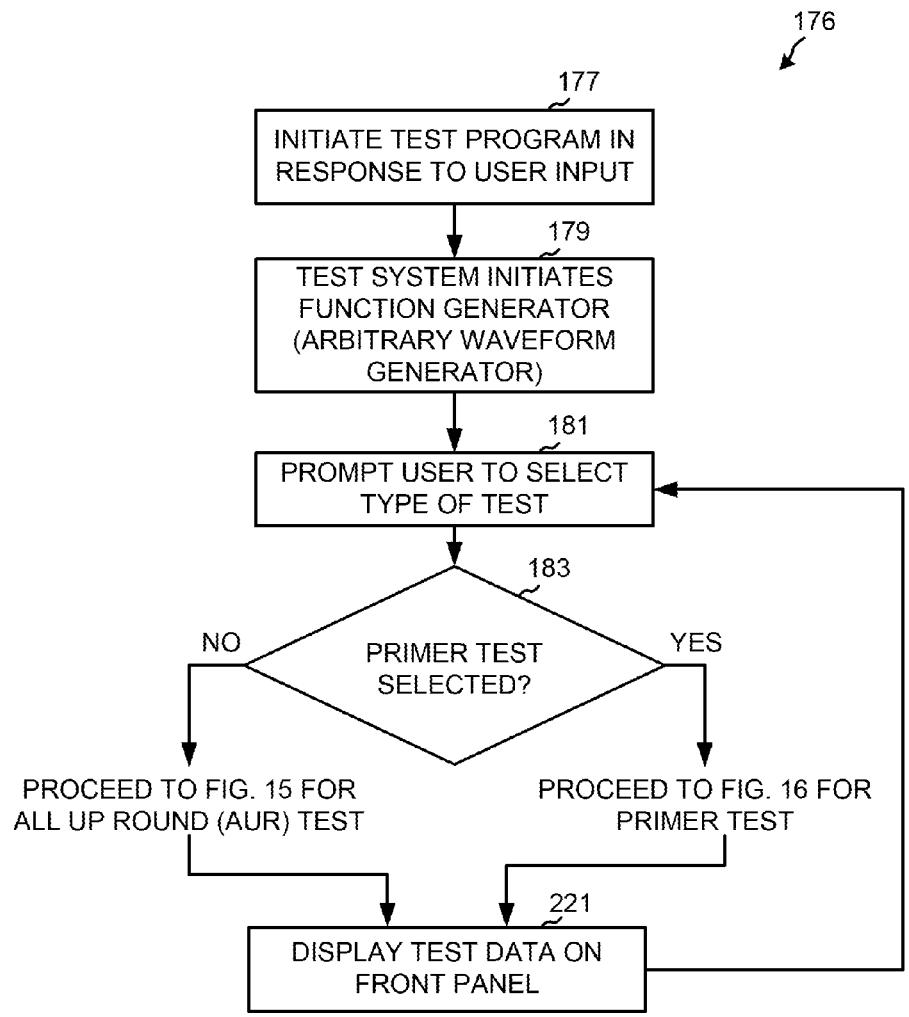
FIG. 14 illustrates an exemplary embodiment of testing system software sequences in an exemplary system-design platform and development environment for a visual programming language.
Figure 15:
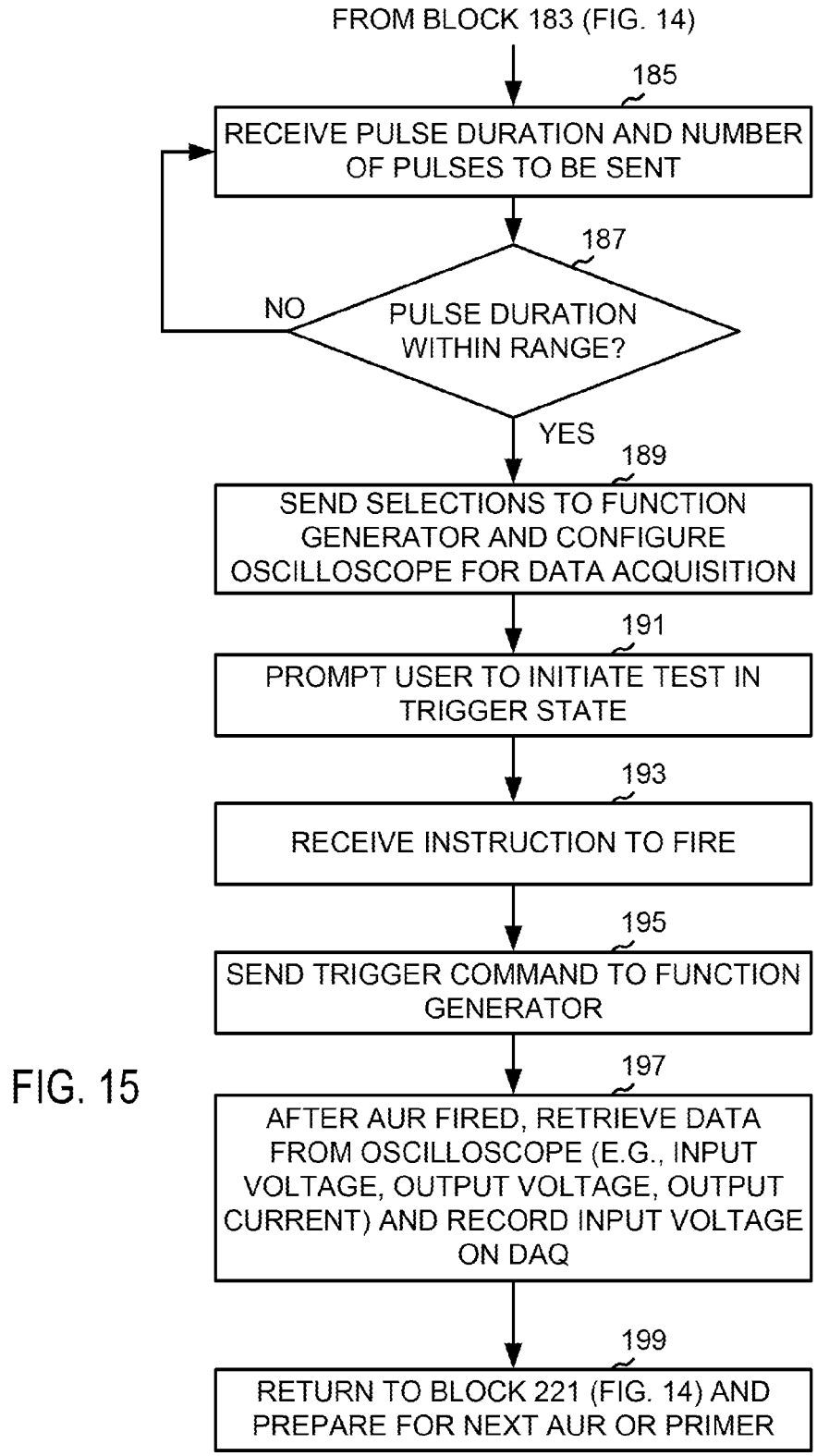
FIG. 15 illustrates a flow diagram of an exemplary AUR test performed by the testing system of FIG. 1.
Figure 16:
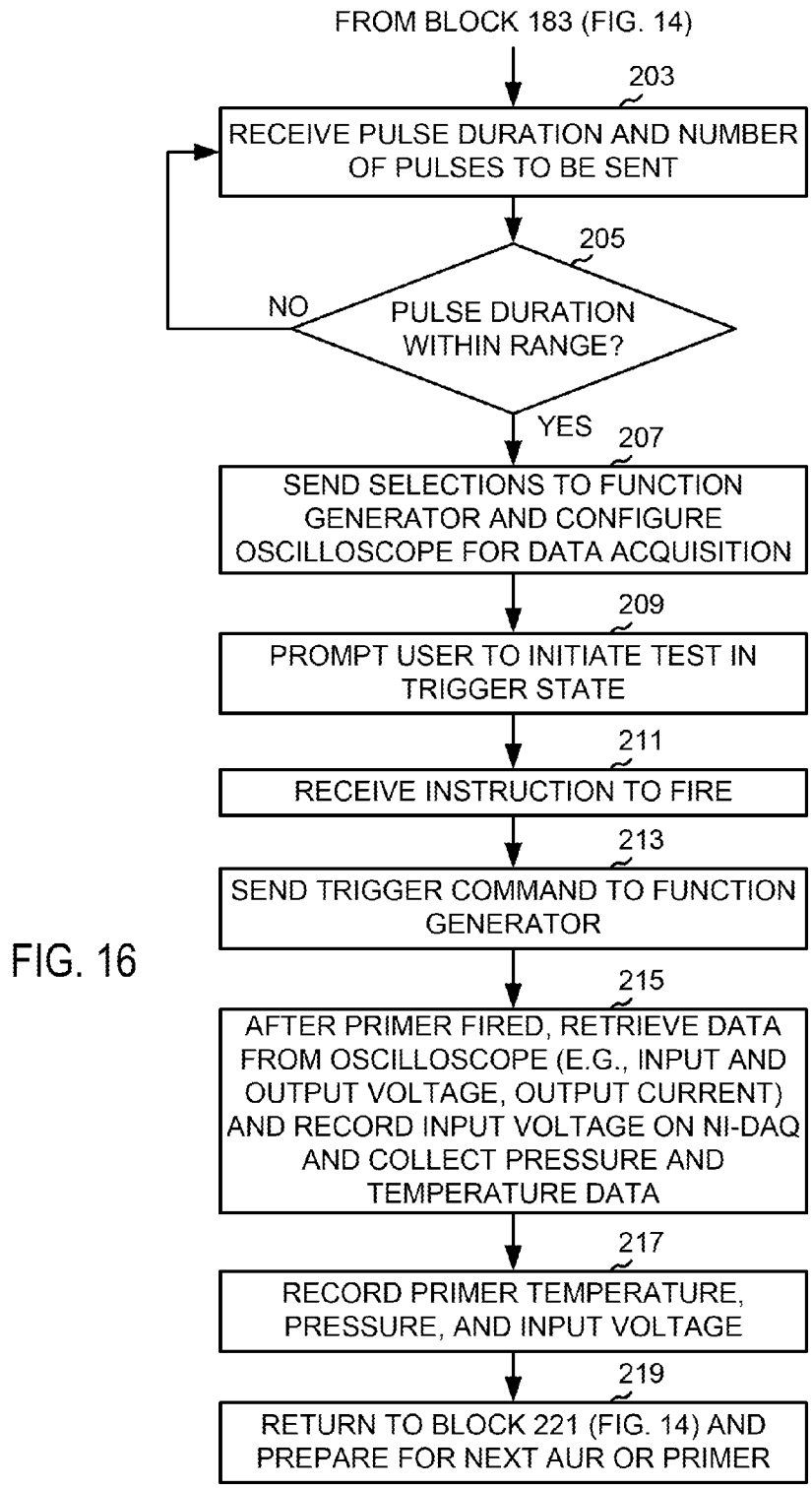
FIG. 16 illustrates a flow diagram of an exemplary primer test performed by the testing system of FIG. 1.

Referring to FIG. 14, a flow diagram 176 of an exemplary method of testing system 10 is illustrated. The function blocks of FIGS. 14-16 are performed by computing device 7 of FIG. 1 executing test software 12. In one example, software processing sequences stored on a machine readable media (e.g., memory 8 of FIG. 1) controls two separate tests that run independent of one another. A first test is for testing the AUR with the propellant and projectile installed in the cartridge. A second test is for primers only and uses cartridges with the projectile and propellant removed. Such a software system allows a user to automate a firing process and to monitor data captured during the firing process. Reference is made to FIG. 1 throughout the following description of FIGS. 14-16.

At block 177 of FIG. 14, computing device 7 initiates the test system program 12 based on user input received via a user interface (e.g., keyboard 1, monitor 3) of test system 10. When test system software is initiated, computing device 7 initializes function generator 17 at block 179 and launches a start-up state, such as start-up state 144 of FIG. 7. From the start-up state, computing device 7 prompts a user at block 181 to select which test to run (e.g., prompt window 133 of FIG. 6), illustratively either the AUR test or the primer test. If the AUR test is selected at block 183, computing device 7 proceeds to FIG. 15 to run the applicable AUR test and collect data. If the primer test is selected at block 183, computing device 7 proceeds to FIG. 16 to run the applicable primer only test and collect data.

Referring to the AUR test of FIG. 15, computing device 7 prompts the user at block 185 to enter pulse parameters including, for example, the desired pulse magnitude, desired pulse duration, and desired number of pulses to be generated. Computing device 7 confirms at block 187 that the entered parameters are within the respective allowable ranges. At block 189, computing device 7 sends the selections from the user to function generator 17 and configures oscilloscope 51 for data acquisition. At block 191, computing device 7 confirms that the user is ready to test by prompting (via GUI 140 of FIG. 5) the user for the trigger command. At block 193, computing device 7 receives the user instruction trigger the firing pulse, and in response computing device 7 sends a trigger command to function generator 17 at block 195, and function generator 17 outputs the trigger signal to switch 37 of firing box 41 for controlled output to the AUR. Once the firing pulse is sent to the AUR by firing box 41, the projectile in the AUR is fired down range. During the firing, computing device 7 retrieves data (e.g., voltage and current input to firing box 41 and output to the AUR) from oscilloscope 51 and records the voltage and/or current via data acquisition board 9 at block 197. At block 199, computing device 7 returns to block 221 of FIG. 14 to display the captured data on GUI 140 (FIG. 5) and to prepare to fire the next AUR or primer.

Referring to FIG. 16, the primer only test is selected at block 183 of FIG. 14. Blocks 203, 205, 207, 209, 211, and 213 of the primer test of FIG. 16 are the same as blocks 185, 187, 189, 191, 193, and 195 of the AUR test of FIG. 15. At block 215 of FIG. 16, once the firing pulse(s) is output to primer 80 in cartridge 77 (FIG. 1), computing device 7 retrieves data from the oscilloscope, records voltage via data acquisition board 9, collects pressure and temperature data via data acquisition board 9, and causes the sub-visual instrument element of the software routine to apply a transfer function to convert the raw temperature data from a voltage to a temperature. Computing device 7 then proceeds to save the data including, for example, the primer temperature and pressure data and voltage and current at block 217. Computing device 7 returns to block 221 of FIG. 14 to display the captured data on GUI 140 (FIG. 5) and to prepare to fire the next AUR or primer.

Figure 17:
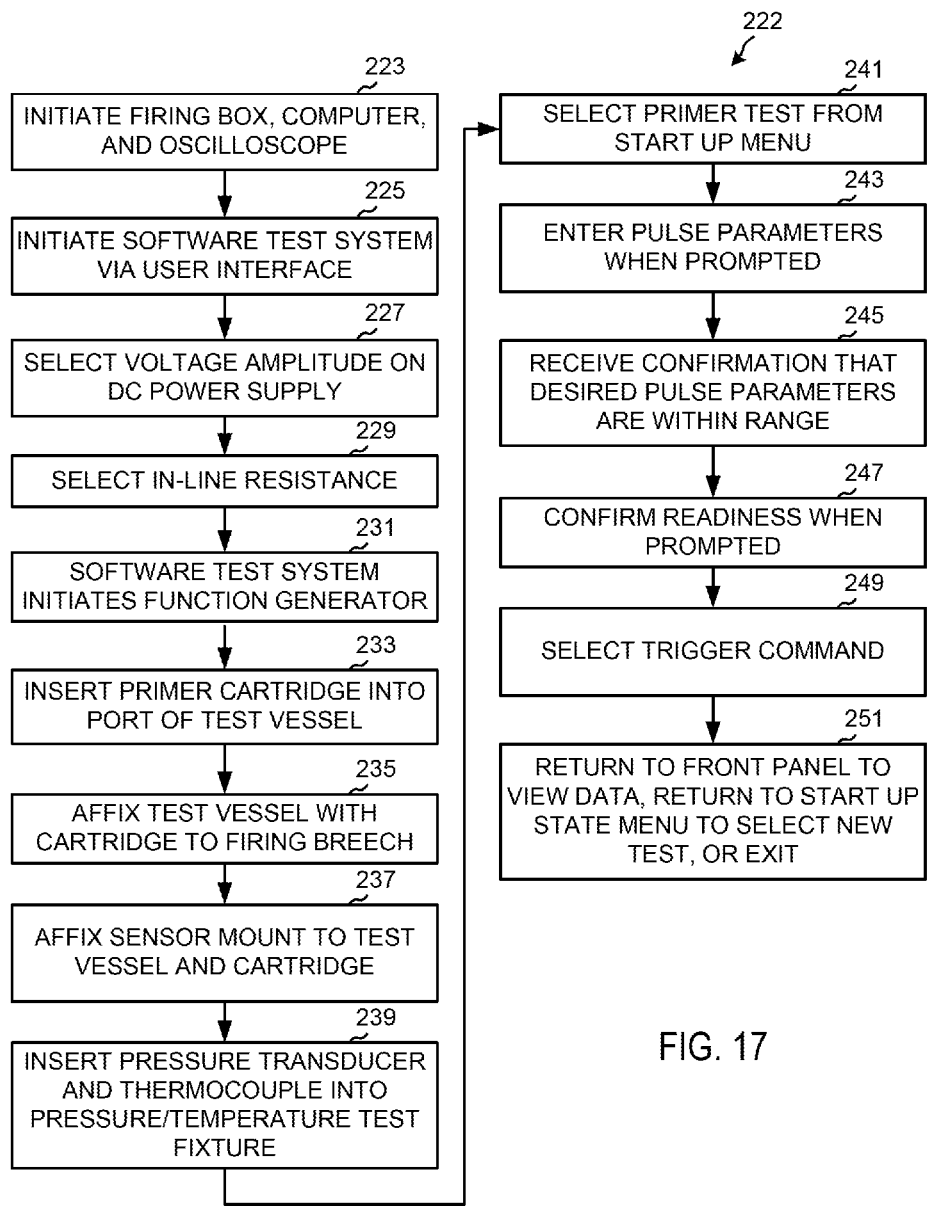
FIG. 17 illustrates an exemplary method for testing an electric primer output.

Referring to FIG. 17, a flow diagram 22 of an exemplary method for testing an electric primer is illustrated. Reference is made to the test system 10 of FIG. 1 throughout the description of FIG. 17. At block 223, a user powers on the firing box 41, computing device 7, function generator 17, and oscilloscope 51 and then initiates the software test system (software 12) via the user interface at block 225. The user sets a voltage amplitude on programmable DC power supply 23 at block 227 and selects an in-line resistance via inputs 97 (FIG. 2) at block 229. At block 231, computing device 7 executing test software 12 initiates function generator 17 in response to the user initiating the software at block 225. The user inserts primer cartridge 77 into the cartridge port 75 of test vessel 79 at block 233 and affixes test vessel 79 to firing breech 83 at block 235. At block 237, the user inserts the sensor mount 72 with sensors 65, 67 into test vessel 79 and cartridge 77 and affixes the sensor mount 72 to the test vessel 79 with fasteners 76. In another embodiment, at block 239, the user inserts pressure transducer 67 and thermocouple 65 into the sensor ports 69 after the test fixture 71 is assembled.

At block 241, the user selects the "Primer" test from software test system start up state menu 133 (FIG. 6), and at block 243 the user enters pulse parameters when prompted by the test system software, including the desired pulse duration and magnitude and the number of pulses to be sent to primer 80, for example. The user receives confirmation from the software test system (e.g., via GUI 140) that the desired pulse parameters are within the acceptable ranges at block 245 and confirms readiness when prompted by the software test system at block 247. The user may also adjust the inline resistance via inputs 97 of FIG. 2. At block 249, the user selects the trigger command to initiate the firing pulse and begin the test, and test system 10 executes the test and collects appropriate data. At block 251, the user returns to the GUI 140 to view data collected from the test, returns to start up state menu to select a new test, and/or exits the software test system program.

Figure 18:
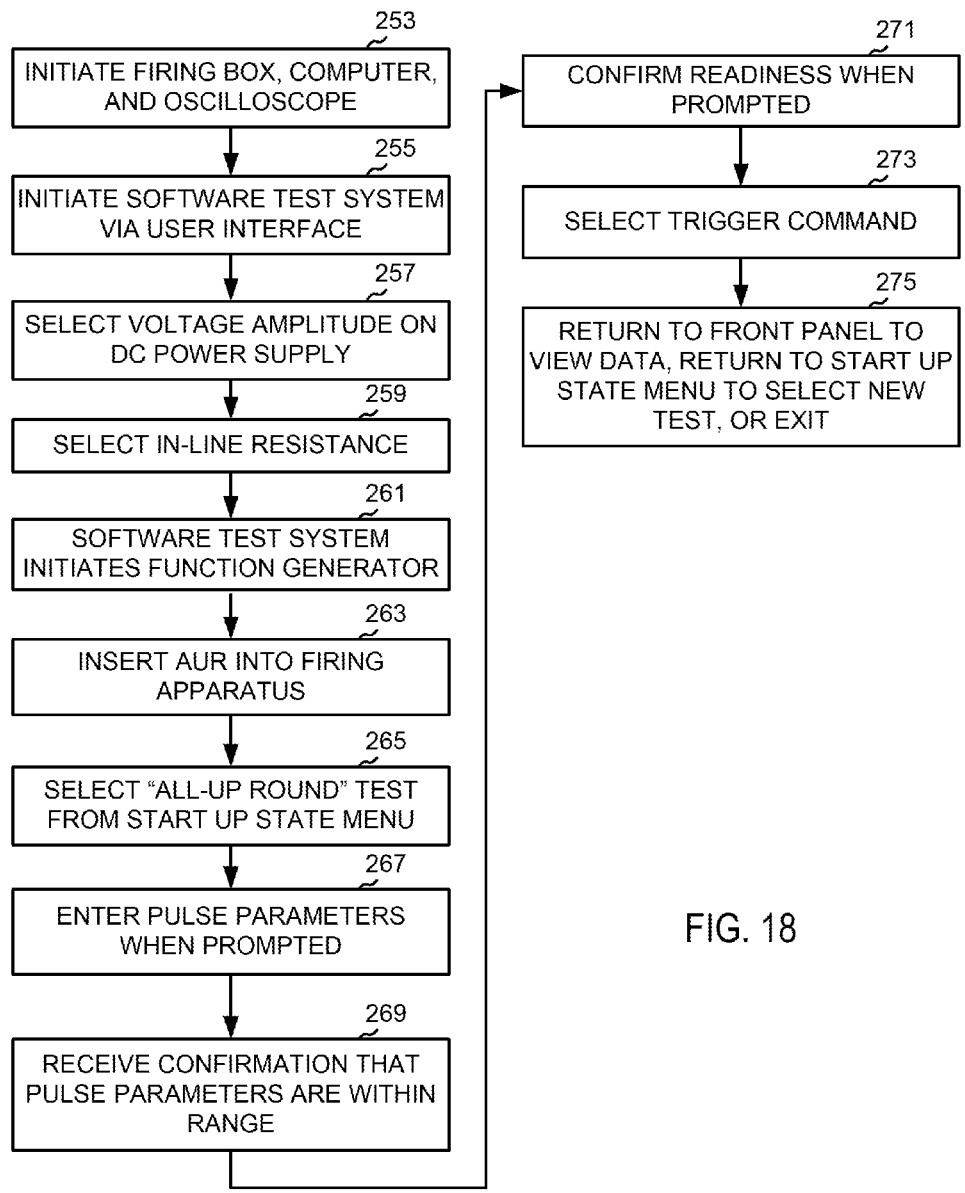
FIG. 18 illustrates an exemplary method for testing an AUR output.

Referring to FIG. 18, an exemplary method for testing an AUR output is illustrated. Blocks 253, 255, 257, 259, and 261 of the AUR test of FIG. 18 are the same as blocks 223, 225, 227, 229, 231 of the primer test of FIG. 17. At block 263, the user inserts the AUR (e.g., AUR 52 of FIG. 19) into the firing apparatus (e.g., gun barrel 54 of FIG. 19) and affixes the firing apparatus to the firing breech 83. At block 265, the user selects "All Up Round" test from software test system start up state menu 133 (FIG. 6), and at block 267 the user enters pulse parameters when prompted by the test system software, including the desired pulse duration and magnitude and the number of pulses to be sent to the AUR, for example. The user receives confirmation from the software test system (e.g., via GUI 140) that the desired pulse parameters are within the acceptable ranges at block 269 and confirms readiness when prompted by the software test system at block 271. The user may also adjust the inline resistance via inputs 97 of FIG. 2. At block 273, the user selects the trigger command to initiate the firing pulse and begin the AUR test. At block 275, the user returns to the GUI 140 to view data collected from the test, returns to start up state menu to select a new test, and/or exits the software test system program.

The following Table 1 illustrates exemplary input parameters variable by a user, corresponding acceptable parameter ranges, and types of data collected for both the AUR test and the primer only test according to one exemplary embodiment. The ranges of Table 1 are illustrative of an exemplary 20 mm bullet initiation.

TABLE 1

| All - Up Round Test | | | Primer Test | | |
|---|---|---|---|---|---|
| Variable Input Parameters | Range | Data Collected | Variable Input Parameters | Range | Data Collected |
| Firing Voltage Amplitude | 0-300 VDC | (1) Applied Output Voltage Signal; (2) Applied Output Current Signal; (3) Control Voltage Signal | Firing Voltage Amplitude | 0-300 VDC | (1) Applied Output Voltage Signal; (2) Applied Output Current Signal; (3) Control Voltage Signal; (4) Primer Pressure of Reaction; (5) Primer Temperature of Reaction |
| Firing Voltage Duration | 1 μs to constant | | Firing Voltage Duration | 1 μs to constant | |
| Number of Pulses | 1 to infinity | | Number of Pulses | 1 to infinity | |
| In-line Resistance | 0 to 2 MΩ | | In-line Resistance | 0 to 2 MΩ | |

In another embodiment, temperature and pressure data are also collected during the AUR test.

Figure 20:
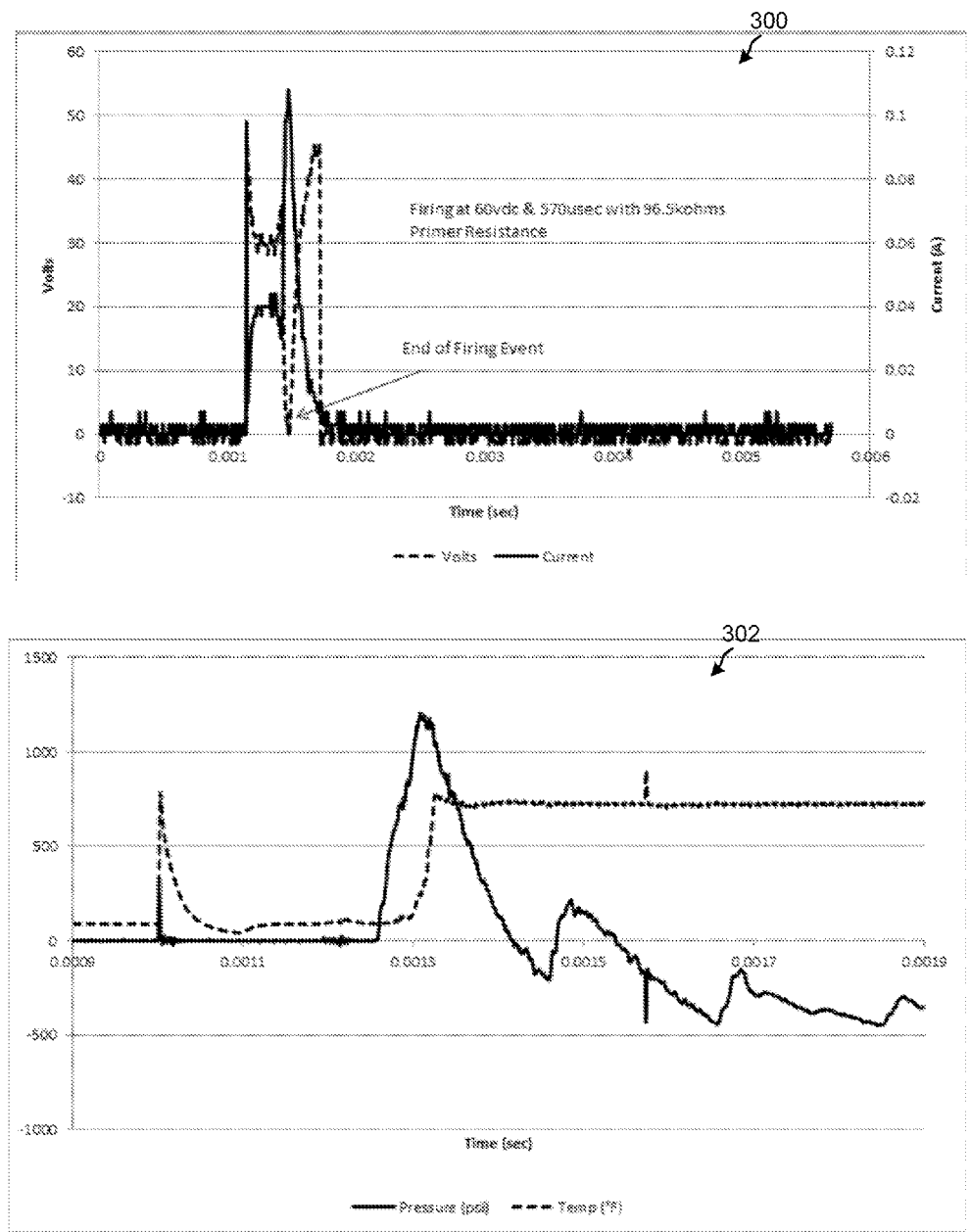
FIG. 20 illustrates graphs of exemplary input and output data from a primer test according to a first test configuration.
Figure 21:
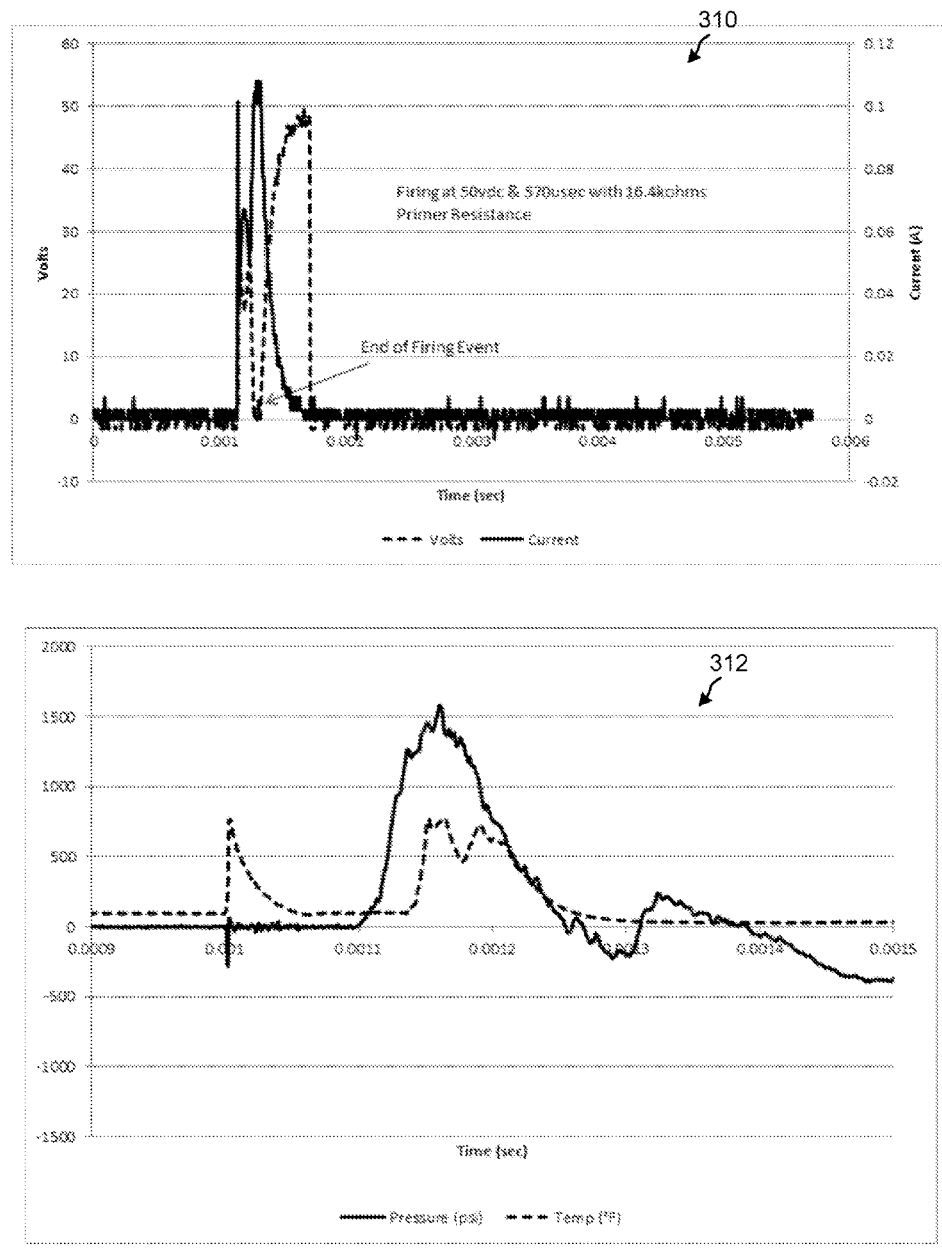
FIG. 21 illustrates graphs of exemplary input and output data from a primer test according to a second test configuration.
Figure 22:
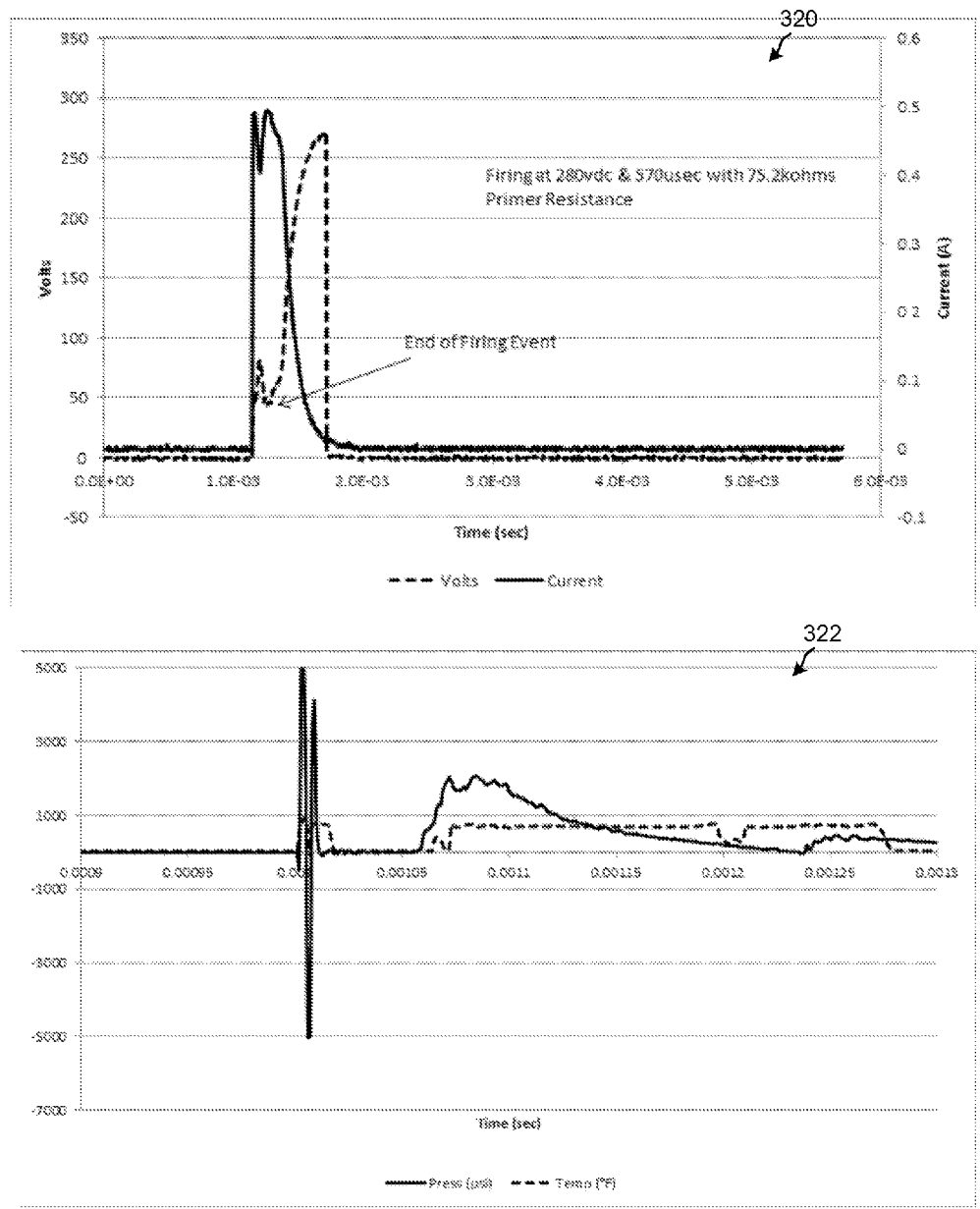
FIG. 22 illustrates graphs of exemplary input and output data from a primer test according to a third test configuration.

FIGS. 20 through 22 illustrate graphs of exemplary test data captured from a primer test performed by test system 10 of FIG. 1. In one embodiment, the graphs of FIGS. 20-22 are provided in corresponding screens of GUI 140 of FIG. 5 for display to a user. Each of FIGS. 20, 21, and 22 depicts test data resulting from different functional parameters applied to the primer test.

In FIG. 20, the functional parameters applied to the primer included a 570 microsecond (μsec) pulse with a 60 VDC magnitude and an inline resistance of 96.5 kΩ. Graph 300 of FIG. 20 illustrates an exemplary electrical stimulus or firing pulse provided to the primer 80, including the voltage (dashed line) and current (solid line) of the firing pulse versus time. The firing event illustratively ends at around 0.0015 microseconds. As such, graph 300 allows a user to verify that the correct voltage pulse width and amplitude as well as current were sent to the primer. A graph 302 illustrates the corresponding output characteristics of the primer versus time as a result of the electrical stimulus depicted in graph 300, the outputs including pressure (solid line) and temperature (dashed line). The firing event of the primer illustratively occurs at around 0.0013 microseconds based on the pressure and temperature curves of graph 302. With graphs 300 and 302, a user may observe the amount of time it takes from application of the electrical pulse on the primer to the primer output (e.g., initiation and firing). As illustrated with graphs 300 and 302, the primer fired at approximately 325 μsec following initial application of the 60 VDC firing pulse as evidenced by the pressure and temperature increases in graph 302.

In FIG. 21, the functional parameters applied to the primer included a 570 microsecond (μsec) pulse at 50 VDC magnitude and an inline resistance of 16.4 kΩ. Referring to FIG. 21, a graph 310 illustrates an exemplary electrical stimulus or firing pulse provided to the primer 80, including the voltage (dashed line) and current (solid line) of the firing pulse versus time. A graph 312 illustrates the corresponding output characteristics of the primer versus time as a result of the electrical stimulus depicted in graph 310, the outputs including pressure (solid line) and temperature (dashed line). As illustrated in graphs 310 and 312, the primer fired at approximately 150 μsec following initial application of the 50 VDC firing pulse as evidenced by the pressure and temperature increases in graph 312.

In FIG. 22, the functional parameters applied to the primer included a 570 microsecond (μsec) pulse at 280 VDC magnitude and an inline resistance of 75.2 kΩ. Referring to FIG. 22, a graph 320 illustrates an exemplary electrical stimulus or firing pulse provided to the primer 80, including the voltage (dashed line) and current (solid line) of the firing pulse versus time. A graph 322 illustrates the corresponding output characteristics of the primer versus time as a result of the electrical stimulus depicted in graph 320, the outputs including pressure (solid line) and temperature (dashed line). As illustrated in graphs 320 and 322, the primer fired at approximately 80 μsec following initial application of the 280 VDC firing pulse as evidenced by the pressure and temperature increases in graph 322.

As observed from FIGS. 20-22, the primer in each test condition fired within 570 μsec following initial application of the firing pulse. Further, FIGS. 20-22 illustrate that primers with lower applied voltage and higher inline resistance exhibited longer action times in firing, while primers with higher applied voltage exhibited shorter times in firing. In one embodiment, an observer may conclude that foreign dirt or debris trapped between the firing pin and the primer may cause a reduction in the voltage at the primer leading to a longer action time in firing.

In one embodiment, the results of the test system analysis show a correlation between voltage, dwell time, and cartridge resistance and show which variables affect primer initiation and to what extent. In one embodiment, the results of the test system analysis provide an indication of whether the gun used to fire the tested primer or AUR contains dirt or debris affecting firing performance, whether the rounds are defective, whether the primer is defective, whether the firing pin area has a mechanical fault or misalignment, etc. In one embodiment, the number of pulses, pulse magnitude, pulse duration, and inline resistance selected by the user with test system 10 are used to simulate poor or intermittent contact of the firing pin with the electric primer during application of the firing pulse to the primer. In one embodiment, the varied inline resistance is used to simulate debris or a foreign object being between the firing pin of the gun and the primer that creates a voltage divider resulting in only a portion of the supplied voltage reaching the primer. In one embodiment, the number of pulses selected by the user with test system 10 may be used to simulate "chatter" or vibration between the firing pin and the electric primer (e.g., the pin skipping across the primer surface) during firing. In one embodiment, the input parameters varied by the user may be used to simulate a long action time for firing the primer or the AUR.

In one embodiment, the electric primer described herein and tested with testing system 10 of FIG. 1 is used in a cannon round (e.g., the M50 20 mm or other suitable round) of a military gun. Other suitable applications of the tested electric primer may be provided. While testing system 10 has been described herein for use with a primer or AUR, testing system 10 may be used to apply pulse signals to and test the output of other suitable electrically initiated gas generators.

The term "logic" or "control logic" or "software module" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The disclosed operations set forth herein may be carried out by one or more suitable processors that are in communication with non-transitory computer readable medium such as but not limited to CDROM, RAM, other forms of ROM, hard drives, distributed memory, etc. The non-transitory computer readable medium stores executable instructions that when executed by the one or more processors cause the one or more processors to perform, for example, the operations of computing device 7 described herein and/or the methods and software sequences as described with reference to FIGS. 7-18.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

The invention claimed is:

1. A system comprising:
   at least one processor;
   a first section including a testing apparatus adapted to hold and initiate an electrically initiated gas generator initiator;
   a second section coupled to said testing apparatus and operable to generate and selectively control an electrical firing signal to said initiator based on a plurality of firing signal input parameters, wherein said plurality of firing signal input parameters comprise a voltage of the electrical firing signal and at least one of a pulse duration of the electrical firing signal and a number of pulses of the electrical firing signal;
   a third section comprising an input/output section including a user interface, said user interface including a display adapted to display a graphical user interface;
   a fourth section comprising a test fixture and an electrical characteristic measurement section operable to measure a plurality of parameters including voltage and current associated with said electrical firing signal, wherein said test fixture comprises a housing adapted to couple to said testing apparatus, wherein said fourth section further includes at least one of a pressure sensor and a temperature sensor coupled to said test fixture, wherein said test fixture includes at least one internal port for receiving said at least one of the pressure sensor and the temperature sensor, said electrically initiated gas generator initiator being positioned in the housing of the test fixture; and
   a machine instruction storage section comprising a plurality of machine readable instructions that when executed by the at least one processor cause the at least one processor to:
      generate a test selection prompt requesting a user to select one of a first test and a second test and configure at least said second section based upon a user selection of said first test;
      obtain said plurality of firing signal input parameters and configure at least said second section for said first test based on said plurality of firing signal input parameters; and
      execute said first test by generating a first user control trigger prompt, initiating sending a first firing activation signal to said second section in response to a user selection of said first user control trigger prompt, and collecting said plurality of parameters from said fourth section generated during said first test, displaying a graphical interface section on said display comprising electrically initiated gas generator initiator data, said electrically initiated gas generator initiator data including temperature and pressure generated during said first test.

2. A test system as in claim 1, wherein the plurality of machine readable instructions when executed by the at least one processor further cause the at least one processor to
obtain a second plurality of firing signal input parameters and configure said second section for said second test based on said second plurality of firing signal input parameters; and
execute said second test by generating a second user control trigger prompt, initiate sending a second firing activation signal to said second section in response to a user selection of said second user control trigger prompt, and displaying a graphical user interface section on said display comprising voltage data and current data, wherein said voltage data comprises voltage over time and said current data comprises current over time of said electrical firing signal applied to a second electrically initiated gas generator initiator.

3. A test system as in claim 1, further comprising a resistance adjustment section electrically coupled between a source of said electrical firing signal and said initiator, said resistance adjustment section being operable to adjust a voltage of said electrical firing signal applied to the initiator.

4. A test system as in claim 1, wherein the plurality of machine readable instructions when executed by the at least one processor cause the at least one processor to adjust said voltage of said electrical firing signal.

5. A test system as in claim 1, wherein said electrically initiated gas generator initiator comprises a primer operable to initiate a propellant charge.

6. A test system as in claim 1, further comprising a firing safety section operable to electrically isolate said second section from said electrically initiated gas generator initiator.

7. A test system as in claim 1, wherein said second section comprises a function generator that receives said first or second firing activation signal and said plurality of parameters, said second section further comprises a high speed, high voltage switch coupled between said function generator and said electrically initiated gas generator initiator, said switch being operated to output said electrical firing signal to said initiator.

8. A test system comprising:
at least one processor;
a first section comprising a holder adapted to hold an electrically activated gas generator initiator positioned within a gas generator charge housing, said initiator being activated by application of at least one firing control signal;
a second section comprising a power supply, a function generator, and a switch operable to selectively generate said at least one firing control signal based on a plurality of firing signal input parameters;
a third section comprising test instrumentation operable to measure at least one of a pressure output and a temperature output from said gas generator initiator and to measure at least one of current data and voltage data during a test;
a fourth section including an input/output section operable to receive user inputs and to output a plurality of outputs; and
a fifth section comprising a machine readable storage section adapted to store a plurality of machine readable instructions operable for controlling said test system, wherein said plurality of machine readable instructions when executed by the at least one processor cause the at least one processor to:
receive a plurality of user inputs including user selection of a type of test and said plurality of firing signal input parameters, and perform an initial configuration of at least said second section based on said plurality of firing signal input parameters;
execute said test by operating said second section to generate said at least one firing control signal so as to activate said initiator and by operating said third section to collect said at least one of the pressure output and the temperature output and the at least one of current data and voltage data during activation of said initiator; and
provide graphical user interface data to said fourth section for displaying said at least one of the pressure output and the temperature output and the at least one of current data and voltage data generated during said test.

9. A test system as in claim 8, wherein said gas generator initiator is an electric primer operable to initiate a propellant charge.

10. A test system as in claim 8, wherein said switch of said second section is operable to generate a voltage associated with said at least one firing control signal in a range from 30 volts to 300 volts, and said switch is operable to generate an electrical pulse associated with said at least one firing control signal having a duration ranging from one microsecond to one thousand microseconds.

11. A test system as in claim 8, wherein said plurality of firing signal input parameters comprise voltage amplitude and at least one of a duration of voltage generation and a number of generated pulses.

12. A test system as in claim 8, wherein said switch is operated by said function generator based on at least one of said plurality of firing signal input parameters.

13. A test system as in claim 12, wherein said plurality of firing signal input parameters comprise voltage amplitude and at least one of a duration of voltage generation and a number of generated pulses.

14. A method of testing comprising:
providing a first section comprising a holder adapted to hold an electrically activated gas generator initiator positioned within a gas generator charge housing, said initiator being configured to activate by application of at least one firing control signal comprising an electrical signal;
providing a second section comprising a power supply, a function generator, and a switch operable to selectively generate said at least one firing control signal based on a plurality of firing signal input parameters;
providing a third section comprising a test instrumentation operable to measure at least one of a pressure output and a temperature output from said gas generator initiator and to measure at least one of current data and voltage data during a test;
providing a fourth section including an input/output section operable to receive user inputs and output a plurality of outputs;
receiving a plurality of user inputs including user selection of a type of test and said plurality of firing signal input parameters and performing an initial configuration of at least said second section based on said plurality of firing signal input parameters;

executing said test by operating said second section to generate said at least one firing control signal so as to activate said initiator;

operating said third section to collect said at least one of the pressure output and the temperature output and the at least one of current data and voltage data during activation of said initiator; and generating graphical user interface data for display on said fourth section comprising said at least one of the pressure output and the temperature output and the at least one of current data and voltage data generated during said test.

15. A method as in claim 14, wherein said gas generator initiator is a primer operable to initiate a propellant charge.

16. A method as in claim 14, wherein said switch of said second section is operable to generate voltage associated with said at least one firing control signal in a range from 30 volts to 300 volts, and said switch is operable to generate an electrical pulse associated with said at least one firing control signal having a duration ranging from one microsecond to one thousand microseconds.

17. A method as in claim 14, wherein said plurality of firing signal input parameters comprise voltage amplitude and at least one of duration of a duration of voltage generation and a number of generated pulses.

18. A method as in claim 14, wherein said switch is operated by said function generator based on at least one of said plurality of firing signal input parameters.

19. A method as in claim 18, wherein said plurality of firing signal input parameters comprise voltage amplitude and at least one of a duration of voltage generation and a number of generated pulses.

20. A method of testing comprising:
providing a control section comprising a programmable DC power supply, a function generator, and a switch operable to selectively generate a firing control signal;
providing an oscilloscope operable to measure said firing control signal;
selecting a voltage amplitude on said programmable DC power supply;
inserting a cartridge into a cartridge port of a test vessel and coupling the test vessel with the cartridge to a firing breech, the cartridge including a primer;
positioning at least one of a pressure transducer and a temperature sensor in the cartridge proximate the primer;
selecting at least one input parameter for said firing control signal, said at least one input parameter including at least one of a pulse duration and a number of pulses associated with said firing control signal;
activating said primer by applying said firing control signal to said primer; and
collecting and displaying on a display data based on output from said at least one of the pressure transducer and the temperature sensor.

21. A method as in claim 20, further comprising providing a firing safety section operable to electrically isolate said power supply from said primer.

22. A method as in claim 20, wherein said switch is operable to generate voltage associated with said firing control signal in a range from 30 volts to 300 volts, and said switch is operable to generate an electrical pulse associated with said firing control signal having a duration ranging from one microsecond to one thousand microseconds.

23. A method as in claim 20, further comprising determining that said selected pulse duration is within a first range.

24. A method as in claim 23, wherein said first range includes values between one microsecond and one thousand microseconds.

25. A method as in claim 20, further comprising selecting an in-line resistance to adjust a voltage of said firing control signal.

26. A method as in claim 20, further comprising inserting a sensor port into the test vessel and the cartridge, wherein the at least one of the pressure transducer and the temperature sensor are positioned in the sensor port of the test vessel.

27. A method as in claim 20, further comprising displaying on the display at least one of current data and voltage data associated with said firing control signal based on output from said oscilloscope.

* * * * *